United States Patent
Ji et al.

(10) Patent No.: US 11,848,418 B2
(45) Date of Patent: Dec. 19, 2023

(54) SINGLE LITHIUM-ION CONDUCTIVE POLYMER ELECTROLYTES FOR SI ANODE-BASED LITHIUM-ION BATTERIES

(71) Applicant: Enevate Corporation, Irvine, CA (US)

(72) Inventors: Liwen Ji, Irvine, CA (US); Benjamin Yong Park, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 17/894,841

(22) Filed: Aug. 24, 2022

(65) Prior Publication Data

US 2023/0127931 A1  Apr. 27, 2023

Related U.S. Application Data

(63) Continuation of application No. 17/507,379, filed on Oct. 21, 2021, now Pat. No. 11,431,027.

(51) Int. Cl.
*H01M 10/0565* (2010.01)
*H01M 10/0525* (2010.01)
*H01M 4/134* (2010.01)
*H01M 4/38* (2006.01)

(52) U.S. Cl.
CPC ....... *H01M 10/0565* (2013.01); *H01M 4/134* (2013.01); *H01M 4/386* (2013.01); *H01M 10/0525* (2013.01); *H01M 2300/0082* (2013.01)

(58) Field of Classification Search
CPC .. H01M 10/0565; H01M 4/134; H01M 4/386; H01M 10/0525; H01M 2300/0082
USPC ........................................................ 429/303
See application file for complete search history.

(56) References Cited

U.S. PATENT DOCUMENTS

2018/0351196 A1    12/2018  Zhamu et al.
2022/0190385 A1*   6/2022   Yang ..................... H01M 10/36

OTHER PUBLICATIONS

H. Liang et al., Study of Lithiated Nafion Ionomer for Lithium Batteries, Journal of Applied Electrochemistry, 2004, vol. 34(12), pp. 1211-1214.
Z. Jin et al., Application of Lithiated Nafion Ionomer Film as Functional Separator for Lithium Sulfur Cells, Journal of Power Sources, 2012, vol. 218, pp. 163-167.
J. Song et al., Ionomer-Liquid Electrolyte Hybrid Ionic Conductor for High Cycling Stability of Lithium Metal Electrodes, Scientific Reports, 2015, vol. 5, p. 14458.
J. Xu et al., High Capacity Silicon Electrodes With Nafion as Binders for Lithium-Ion Batteries, Journal of the Electrochemical Society, 2016, vol. 163(3), pp. A401-A405.

* cited by examiner

*Primary Examiner* — Gary D Harris
(74) *Attorney, Agent, or Firm* — McAndrews, Held & Malloy, Ltd.

(57) ABSTRACT

Single Li-ion conducting solid-state polymer electrolytes for use in energy storage devices are disclosed. The energy storage device comprises a first electrode and a second electrode, where at least one of the first electrode and the second electrode is a Si-based electrode, a separator between the first electrode and the second electrode, and an electrolyte. Electrolytes may include all-solid-state polymer electrolytes, quasi-solid polymer electrolytes and/or polymer gel electrolytes. The single Li-ion conducting solid-state polymer electrolytes can improve the electrochemical performances and safety of Si anode-based Li-ion batteries.

10 Claims, 15 Drawing Sheets

SINGLE LITHIUM-ION CONDUCTIVE POLYMER ELECTROLYTES FOR SI ANODE-BASED LITHIUM-ION BATTERIES

CROSS-REFERENCE TO RELATED APPLICATIONS/INCORPORATION BY REFERENCE

This application is a continuation of and claims the benefit of U.S. application Ser. No. 17/507,379 filed Oct. 21, 2021, (now allowed). The entirety of the above referenced application is hereby incorporated by reference.

FIELD

Aspects of the present disclosure relate to energy generation and storage. More specifically, certain embodiments of the disclosure relate to single lithium-ion conducting polymer electrolytes for Si anode-based lithium-ion batteries.

BACKGROUND

Conventional approaches for battery electrodes may be costly, cumbersome, and/or inefficient—e.g., they may be complex and/or time-consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for single lithium-ion conducting polymer electrolytes for Si anode-based lithium-ion batteries, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
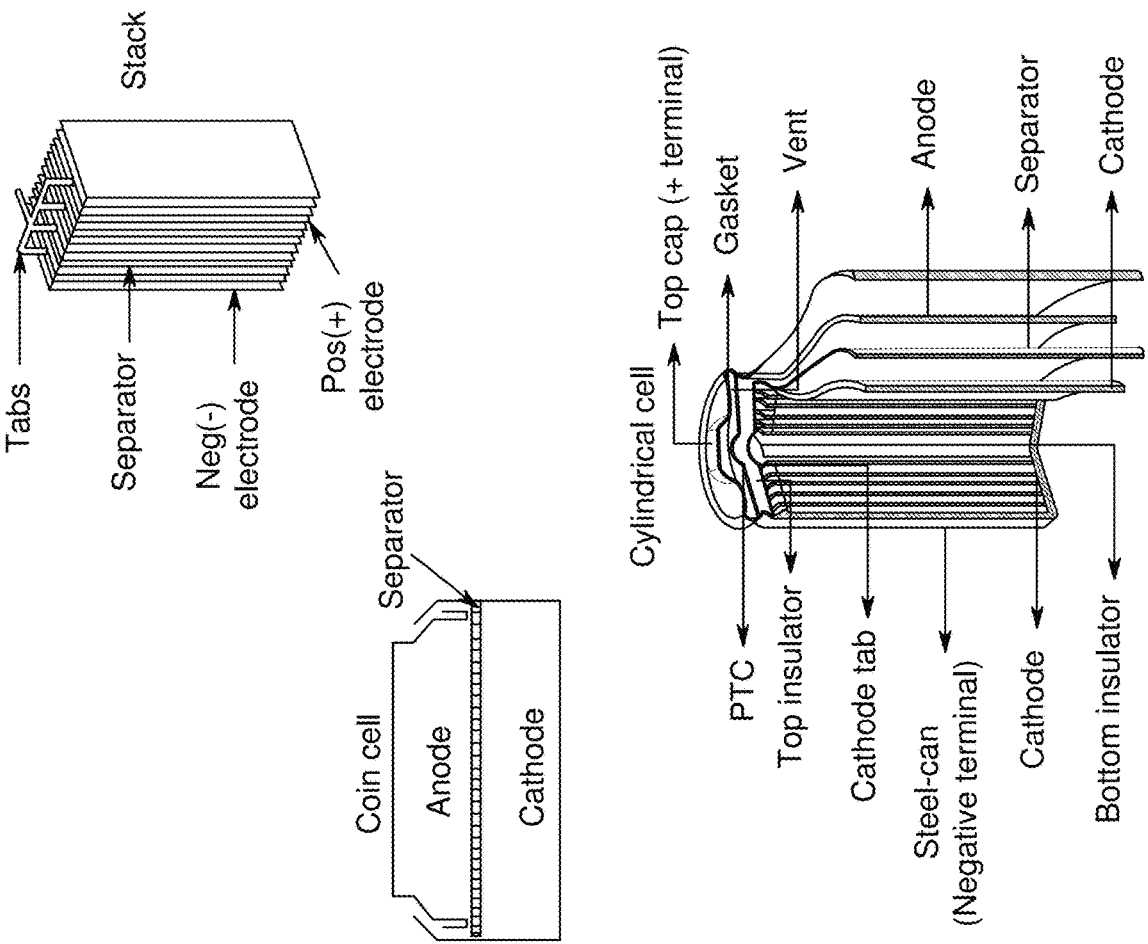
FIG. 1 is a diagram of a battery, in accordance with an example embodiment of the disclosure.
Figure 1:
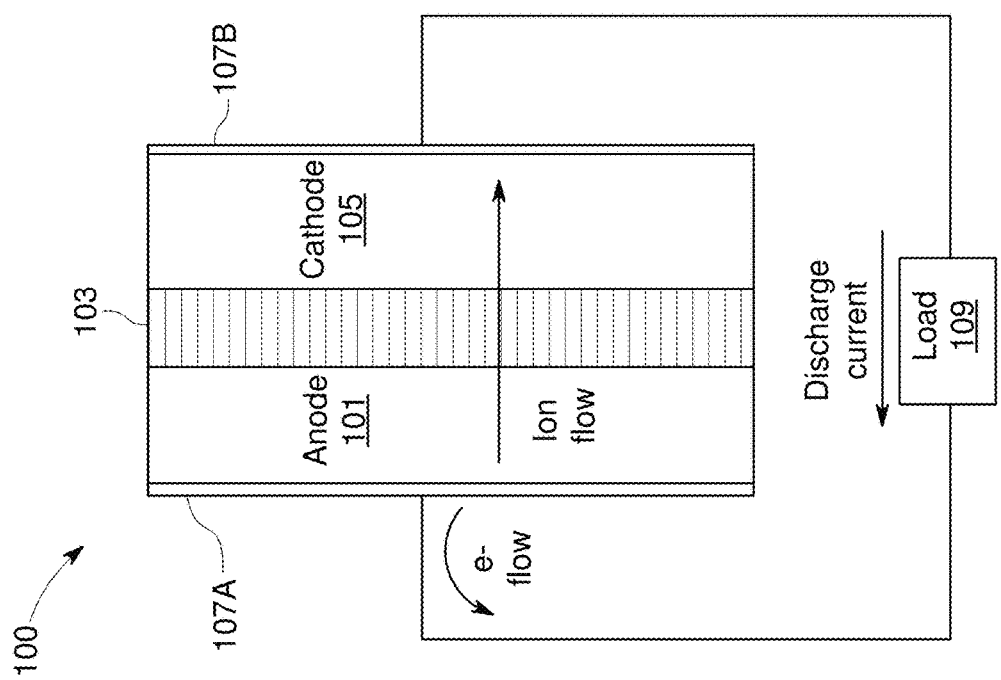

FIG. 1 is a diagram of a battery with silicon-dominant anodes, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the battery 100 shown in FIG. 1 is a very simplified example merely to show the principle of operation of a lithium-ion cell. Examples of realistic structures are shown to the right in FIG. 1, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high-performance electrochemical energy storage. Small-scale (<100 Wh) to large-scale (>10 KWh) devices primarily use lithium-ion (Li-ion) batteries over other rechargeable battery chemistries due to their high performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes. Electrolytes may also be solid-state or quasi-solid-state as disclosed herein.

The configuration shown in FIG. 1 illustrates the battery 100 in discharge mode, whereas in a charging configuration, load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator, and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, LiPFe, and $LiClO_4$ etc. In an example scenario, the electrolyte may comprise Lithium hexafluorophosphate (LiPFe) and lithium bis(trifluoromethanesulfonyl)imide (LiTFSI) that may be used together in a variety of electrolyte solvents. Lithium hexafluorophosphate (LiPFe) may be present at a concentration of about 0.1 to 4.0 molar (M) and lithium bis(trifluoromethanesulfonyl)imide (LiTFSI) may be present at a concentration of about 0 to 4.0 molar (M). Solvents may comprise one or more of ethylene carbonate (EC), fluoroethylene carbonate (FEC), and/or ethyl methyl carbonate (EMC) in various percentages. In some embodiments, the electrolyte solvents may comprise one or more of EC from about 0-40%, FEC from about 2-40%, and/or EMC from about 50-70%.

The separator 103 may be wet or soaked with a liquid or gel electrolyte. In addition, in an example embodiment, the separator 103 does not melt below about 100 to 120° C. and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through gelling or other processes even without significant porosity. The porosity of the separator 103 is also generally not too porous to allow the anode 101 and cathode 105 to transfer electrons through the separator 103. In some embodiments, the separator may comprise or consist of a solid electrolyte.

The anode 101 and cathode 105 comprise electrodes for the battery 100, providing electrical connections to the device for the transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliampere hours per gram. Graphite, the active material used in most lithium-ion battery anodes, has a theoretical energy density of 372 milliampere hours per gram (mAh/g). In comparison, silicon has a high theoretical capacity of 4200 mAh/g. To increase the volumetric and gravimetric energy density of lithium-ion batteries, silicon may be used as the active material for the cathode or anode. Silicon anodes may be formed from silicon composites, with more than 50% silicon or more by weight in the anode material on the current collector, for example.

In an example scenario, the anode 101 and cathode 105 store the ion used for the separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through load 109 to the negative current collector 107A. The separator 103 blocks the flow of electrons inside the battery 100, allows the flow of lithium ions, and prevents direct contact between the electrodes.

While battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally nonflammable electrolytes with high voltage stability and interfacial compatibility with electrodes. In addition, materials with low toxicity are beneficial as battery materials to reduce process costs and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (for example, SuperP), vapor-grown carbon fibers (VGCF), carbon nanotubes, graphene, and mixtures thereof have previously been incorporated separately into the anode electrode resulting in improved performance of the anode. The synergistic interactions between two or more carbon materials may facilitate electrical contact throughout the large volume changes of the silicon anode during charge and discharge. These contact points facilitate the electrical contact between anode material and current collector to mitigate the isolation (island formation) of the electrode material while also improving conductivity in between silicon regions.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (4200 mAh/g vs. 372 mAh/g for graphite) and volumetric capacities (2194 mAh/L vs. 890 mAh/L for graphite). In addition, silicon-based anodes have a low lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life. Therefore, silicon anodes require a strong conductive matrix that (a) holds silicon particles in the anode, (b) is flexible enough to accommodate the large volume expansion and contraction of silicon, and (c) allows fast conduction of electrons within the matrix.

Therefore, there is a trade-off among the functions of active materials, conductive additives, and polymer binders. The balance may be adversely impacted by high energy density silicon anodes with low conductivity and huge volume variations described above. Polymer binder(s) may be pyrolyzed to create a pyrolytic carbon matrix with embedded silicon particles. In addition, the polymers may be selected from polymers that are completely or partially soluble in water or other environmentally benign solvents or mixtures and combinations thereof. Polymer suspensions of materials that are non-soluble in water could also be utilized.

As the demands for both zero-emission electric vehicles and grid-based energy storage systems increase, lower costs and improvements in energy density, power density, and safety of lithium (Li)-ion batteries are highly desirable. Enabling the high energy density and safety of Li-ion batteries requires the development of high-capacity, and high-voltage cathodes, high-capacity anodes, and accordingly functional electrolytes with high voltage stability, interfacial compatibility with electrodes and safety.

A lithium-ion battery typically includes a separator and/or electrolyte between an anode and a cathode. In one class of batteries, the separator, cathode, and anode materials are individually formed into sheets or films. Sheets of the cathode, separator, and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces which are then layered into stacks. The stacks are of alternating electro-chemically active materials with the separator between them.

Si is one of the most promising anode materials for Li-ion batteries due to its high specific gravimetric and volumetric capacity (discussed above), and low lithiation potential (<0.4 V vs. Li/Li+). Cathode materials may include Lithium Nickel Cobalt Manganese Oxide (NMC (NCM): $LiNi_xCo_yMn_zO_2$, x+y+z=1); Lithium Iron Phosphate (LFP: $LiFePO_4$/C); Lithium Nickel Manganese Spinel (LNMO: $LiNi_{0.5}Mn_{1.5}O_4$); Lithium Nickel Cobalt Aluminium Oxide (NCA: $LiNi_aCo_bAl_cO_2$, a+b+c=1); Li-rich layered oxides $xLi_2MnO_3·(1-x)LiMO_2$ (M ¼ Ni, Co, Cr), Lithium Manganese Oxide (LMO: $LiMn_2O_4$); and Lithium Cobalt Oxide (LCO:$LiCoO_2$).

Among the various cathodes presently available, layered lithium transition-metal oxides such as Ni-rich $LiNi_xCo_yMn_zO_2$ (NCM, 0≤x, y, z<1) or $LiNi_xCo_yAl_zO_2$ (NCA, 0≤x, y, z<1) are promising ones due to their high theoretical capacity (~ 280 mAh/g) and relatively high average operating potential (3.6 V vs Li/Li+). In addition to Ni-rich NCM or NCA cathode, $LiCoO_2$ (LCO) is also a very attractive cathode material because of its relatively high theoretical specific capacity of 274 mAh $g^{-1}$, high theoretical volumetric capacity of 1363 mAh $cm^{-3}$, low self-discharge, high discharge voltage, and good cycling performance. In some embodiments, the cathode may be of the formula $LiNi_xCo_yMn_zAl_aO_2$, x+y+z+a=1) where Ni may be equal or greater than 60%; >60%; equal or greater than 80%; or >80%.

Coupling Si anodes with high-voltage Ni-rich NCM (or NCA) or LCO cathodes can deliver more energy than conventional Li-ion batteries with graphite-based anodes, due to the high capacity of these new electrodes.

However, both Si-based anodes and high-voltage Ni-rich NCM (or NCA) or LCO cathodes face formidable technological challenges, and long-term cycling stability with high-Si anodes paired with NCM or NCA cathodes has yet to be achieved.

For anodes, silicon-based materials can provide significant improvement in energy density. However, the large volumetric expansion (e.g., >300%) during the Li alloying/dealloying processes can lead to disintegration of the active material and the loss of electrical conduction paths, thereby reducing the cycling life of the battery. In addition, an unstable solid electrolyte interphase (SEI) layer can develop on the surface of the cycled anodes and leads to an endless exposure of Si particle surfaces to the liquid electrolyte. This results in an irreversible capacity loss at each cycle due to the reduction at the low potential where the liquid electrolyte reacts with the exposed surface of the Si anode. In addition, oxidative instability of the conventional non-aqueous electrolyte takes place at voltages beyond 4.5 V, which can lead to accelerated decay of cycling performance. Because of the generally inferior cycle life of Si compared to graphite, only a small amount of Si or Si alloy is used in conventional anode materials.

The cathode (e.g., NCM (or NCA) or LCO) usually suffers from inferior stability and a low capacity retention at a high cut-off potential. The reasons can be ascribed to the unstable surface layer's gradual exfoliation, the continuous electrolyte decomposition, and the transition metal ion dissolution into electrolyte solution; further causes for inferior performance can be: (i) structural changes from layered to spinel upon cycling; (ii) Mn- and Ni-dissolution giving rise to surface side reactions at the graphite anode; and (iii) oxidative instability of conventional carbonate-based electrolytes at high voltage. The major limitations for LCO cathodes are high cost, low thermal stability, and fast capacity fade at high current rates or during deep cycling. LCO cathodes are expensive because of the high cost of Co. Low thermal stability refers to an exothermic release of oxygen when a lithium metal oxide cathode is heated. In order to make good use of Si anode//NCM or NCA cathode, and Si anode//LCO cathode-based Li-ion battery systems, the aforementioned barriers need to be overcome.

In general, for organic solvent-based electrolytes, volume expansion and extraction of Si anodes upon long-term charging/discharging causes repetitive exposure of fresh surface in Si anode to liquid electrolytes, which results in the formation and growth of the SEI layer, the continuous decomposition of the electrolyte, and low Coulombic efficiency (CE). When paired with high-voltage nickel-rich cathodes (such as NCM or NCA), the oxidation of the electrolyte, the dissolution of transition metal ions, and the subsequent crystal structural damage further reduce battery performance. To alleviate these issues, a tremendous effort has been put in place to stabilize the interfaces between the electrolyte and both Si anodes and NCM (or NCA) cathodes through adopting new electrolytes or adding some novel additives into electrolyte solutions. In addition, safety issues may be major concerns in the applications of organic liquid electrolyte-based Li-ion batteries. Safety risks may be substantially lowered if the organic liquid electrolytes can be replaced by nonvolatile and nonflammable solid electrolytes.

Solid-state polymer electrolytes are representatives of solid-state electrolytes which have been attempted because they can overcome some problems in the Li-ion batteries caused by organic liquid electrolytes (such as leakage of organic solvents, flammability, etc.) and or inorganic solid ones (such as poor mechanical properties, low elastic moduli, high cost in materials, production, and processing, etc.). However, sufficiently high lithium conductivity at room temperature is yet to be demonstrated with solvent-free polymer electrolytes, due to the crystallization of polymer at room temperature, which heavily hampers the $Li^+$-ion transport. Quasi-solid-state polymer systems or polymer gel electrolytes (fabricated by soaking a certain amount of liquid electrolyte into polymer solid membranes) may be one of the strategies to improve the conductivity before fully solid systems are realized.

In today's commercial Li-ion batteries, a liquid solution of lithium hexafluorophosphate ($LiPF_6$) or other Li salts may be dissolved in a mixture of cyclic carbonates (e.g., ethylene carbonate (EC), Fluoroethylene carbonate (FEC), vinyl carbonate (VC), trifluoropropylene carbonate (TFPC), etc.), and linear organic carbonates (dimethyl carbonate (DMC), diethylene carbonate (DEC), and ethyl methyl carbonate (EMC), etc.) may be used as the dominant electrolyte. However, at elevated temperatures, detrimental impacts on the electrochemical performance and safety of Li-ion batteries arise due to the instability of $LiPF_6$ toward a trace amount of protic species in the as-prepared electrolyte, and the flammability of organic solvents. This is especially crucial for their utilization in large-format batteries, which are being developed for electric vehicle and stationary applications.

One strategy for overcoming these barriers includes exploring new electrolytes that minimize or even eliminate volatile and/or flammable solvents such as polymer quasi-solid or solid-state electrolytes. The absence of such solvents in polymer solid-state electrolytes are expected to be safer than their liquid counterparts and even minimizing the amount of liquid organic electrolyte in quasi-solid cells (or polymer gel electrolyte-based cells) where only a small amount of liquid electrolyte is added into polymer solid-solid electrolyte can help improve both safety and performance. Even in a quasi-solid system (or polymer gel system) with a small amount of liquid electrolyte, some of these advantages are expected to be preserved. In addition, polymer electrolytes (including all-solid-state polymer electrolytes, quasi-solid polymer electrolytes or polymer gel electrolytes) may overcome problems in Li-ion batteries caused by organic liquid electrolytes (such as leakage of organic solvents, flammability, etc.) and/or inorganic solid-solid ones (such as poor mechanical properties, low elastic moduli, etc.).

Conventional solid polymer electrolytes such as those formed by dissolving Li salt with a small anion in a polymer host (e.g., PEO, PVDF-HFP, PAN, PMMA, etc.) are dual-ion conductors, in which both $Li^+$ cations and counter anions are mobile. In particular, $Li^+$ cations are generally less mobile than their anionic counterpart, as their motion is highly coupled with that of Lewis basic sites of the polymeric matrix. During the cycles of discharge of the cell, both $Li^+$ cations and counter anions move oppositely in the polymer matrix; however, the anions tend to accumulate at the anode side and cause concentration gradients because the electrodes are blocking toward them. This leads to polarization, and hence poor performances of the cell, such as voltage losses, higher internal impedance and undesirable reactions, finally causing cell failure.

In single Li-ion conducting solid polymer electrolytes, only $Li^+$ cations are involved in transport. Because the Li-ion transference number can approach unity, there are also no concentration gradients that can occur in the solution phase and the utilization of active electrode materials may remain 100% even at the relatively high current rate. Therefore, single Li-ion conducting solid polymer electrolytes are highly desirable to overcome the challenges and drawbacks of conventional dual-ion conducting solid-state polymer electrolytes. In some embodiments, the solid polymer electrolyte may be combined with a dual-ion conductor. In some embodiments, the dual-ion conductor may be a liquid electrolyte and in other embodiments, the dual-ion conductor may be a solid electrolyte.

In this disclosure, the use of single Li-ion conducting solid-state polymer electrolytes to improve the electrochemical performances and safety of Si anode-based Li-ion batteries is described. In some embodiments, a small amount of liquid electrolyte solvent may be included, creating a quasi-solid cell. In other embodiments, a polymer gel electrolyte system is present, which is a type of quasi-solid. In a further embodiment, a modified lithiated Nafion (Li-Nafion) membrane may be used as single Li-ion conducting polymer electrolyte to build Si-dominant anode//NCA cathode full cells. Due to the special composition of the polymer composite and the corresponding synergistic effect among different components, this quasi-solid-state single lithium-ion conducting polymer electrolytes may possess good $Li^+$-ion conductivity, a greater electrochemical stability voltage window, enhanced thermal stability/mechanical properties, and diminished flammability. These may help increase both Li-ion battery lifetime and safety. Further, the quasi-solid-state single lithium-ion conducting polymer electrolytes may produce one or more of the following benefits: increased energy density, increased safety, increased thermal stability of the electrolyte, enhanced high-temperature performance of the cells, decreased impedance increase in electrode interfaces, and/or decreased gassing.

Traditional solid state electrolytes may be dual-ion conductors, in which both cations and anions are mobile. These materials may cause a concentration polarization. A single ion conducting solid-state polymer is a material where one ion predominates over all others. A predominate ion is significantly more mobile than other ions. A single ion conducting polymer has a high cationic or anionic transference number, which may be close to 1. In some embodiments, the transference number may be higher than 0.9; 0.8; or 0.7. The single Li-ion conducting solid-state polymer materials described herein have Li bonded to the polymer or otherwise immobilized. In some embodiments, these materials may achieve a high Li-ion transference number (LTN), which may be higher than 0.9; 0.8; or 0.7.

Theoretically, the SEI layer does not form on the surface of Si anode in pure solid-state electrolytes since only Li-ions are mobile and any reactants required for SEI formation are not supplied to the Si anode surface. Furthermore, morphological changes in Si-based anode are prevented in solid-state electrolytes since Si anodes are confined to a limited space formed between the current collector and the solid-state electrolyte membrane. On the Ni-rich NCM or NCA cathode sides, all steps of the dissolution, migration, and incorporation processes involving the transition metal ions may also be minimized or prevented in the solid-state electrolyte, quasi-solid electrolyte or polymer gel electrolyte systems, thereby decelerating the depletion of cyclable Li-ions and diminishes cell performance deterioration.

As discussed above, solid-state electrolytes may be used in anodes or cathodes or both. In another embodiment, solid-state electrolytes may be used in the separator. When solid-state electrolytes are a part of the separator, they may be present within the separator, or the solid-state materials may themselves form the separator. In some embodiments, the separator may comprise or consist of a solid polymer electrolyte. Further, when solid-state electrolytes are a part of (or form) the separator, the same or different solid-state electrolytes may also be a part of the anode, cathode or both.

When the separator comprises or consists of a solid polymer electrolyte, the polymer may form a thin polymer film. These thin polymer films may be impermeable and may be 50 microns or less in thickness. In other embodiments, the impermeable film may be 30 microns or less in thickness; 25 microns or less in thickness; or 20 microns or less in thickness. When the separator is an impermeable film, this allows for the anode and cathode sides of the cell to be isolated and thus different electrolytes may be used for the anode (anolyte) and the cathode (catholyte). In some embodiments, the electrolytes for the cathode and the anode may be the same or different and may comprise solid, liquid or gel electrolytes or combinations thereof.

As discussed above, typical electrodes include a current collector such as a copper sheet. Carbon is deposited onto the collector along with an inactive binder material. Carbon is often used because it has excellent electrochemical properties and is also electrically conductive. If the current collector layer (e.g., copper layer) was removed, the carbon would likely be unable to mechanically support itself. Therefore, conventional electrodes require a support structure such as the collector to be able to function as an electrode. The electrode (e.g., anode or cathode) compositions described in this application can produce self-supported electrodes. The need for a metal foil current collector is eliminated or minimized because the conductive carbonized polymer is used for current collection in the anode structure as well as for mechanical support. In typical applications for the mobile industry, a metal current collector is typically added to ensure sufficient rate performance. The carbonized polymer can form a substantially continuous conductive carbon phase in the entire electrode as opposed to particulate carbon suspended in a non-conductive binder in one class of conventional lithium-ion battery electrodes. Advantages of a carbon composite blend that utilizes a carbonized polymer can include, for example, 1) higher capacity, 2) enhanced overcharge/discharge protection, 3) lower irreversible capacity due to the elimination (or minimization) of metal foil current collectors, and 4) potential cost savings due to simpler manufacturing.

In order to increase the volumetric and gravimetric energy density of lithium-ion batteries, silicon may be used as the active material for the cathode or anode. Several types of silicon materials, e.g., silicon nanopowders, silicon nanofibers, porous silicon, and ball-milled silicon, have also been reported as viable candidates as active materials for the negative or positive electrodes. Small particle sizes (for example, sizes in the nanometer range) generally can increase cycle life performance. They also can display very high initial irreversible capacity. However, small particle sizes also can result in very low volumetric energy density (for example, for the overall cell stack) due to the difficulty of packing the active material. Larger particle sizes, (for example, sizes in the micron range) generally can result in higher density anode material. However, the expansion of the silicon active material can result in poor cycle life due to particle cracking. For example, silicon can swell over 300% upon lithium insertion. Because of this expansion, anodes including silicon should be allowed to expand while maintaining electrical contact between the silicon particles.

Cathode electrodes (positive electrodes) described herein may include metal oxide cathode materials, such as Lithium Cobalt Oxide (LiCoO$_2$) (LCO), Ni-rich oxides, high voltage cathode materials, lithium-rich oxides, nickel-rich layered oxides, lithium-rich layered oxides, high-voltage spinel oxides, and high-voltage polyanionic compounds. Ni-rich oxides and/or high voltage cathode materials may include NCM and NCA. Example of NCM materials include, but are not limited to, LiNi$_{0.6}$Co$_{0.2}$Mn$_{0.2}$O$_2$ (NCM-622) and LiNi$_{0.8}$Co$_{0.1}$Mn$_{0.1}$O$_2$ (NCM-811). Lithium-rich oxides may include xLi$_2$Mn$_3$O$_2$·(1−x)LiNi$_a$Co$_b$Mn$_c$O$_2$. Nickel-rich layered oxides may include LiNi$_{1+x}$M$_{1-x}$O$_z$ (where M=Co, Mn or Al). Lithium-rich layered oxides may include LiNi$_{1+x}$M$_{1-x}$O$_2$ (where M=Co, Mn or Ni). High-voltage spinel oxides may include LiNi$_{0.5}$Mn$_{1.5}$O$_4$. High-voltage polyanionic compounds may include phosphates, sulfates, silicates, etc.

In certain embodiments, the positive electrode may be one of NCA, NCM, LMO or LCO. The NCM cathodes include NCM 9 0.5 0.5, NCM811, NCM622, NCM532, NCM433, NCM111, and others. In further embodiments, the positive electrode comprises a lithium-rich layered oxide xLi$_2$MnO$_3$·(1−x)LiNi$_a$Co$_b$Mn$_c$O$_2$; nickel-rich layered oxide LiNi$_{1-x}$M$_x$O$_2$ (M=Co, Mn and Al); or lithium-rich layered oxide LiNi$_{1+x}$M$_{1-x}$O$_2$ (M=Co, Mn and Ni) cathode. In some embodiments, the cathode may be of the formula LiNi$_x$Co$_y$Mn$_z$Al$_a$O$_2$, x+y+z+a=1) where Ni may be equal or greater than 60%; >60%; equal or greater than 80%; or >80%.

As described herein and in U.S. patent application Ser. Nos. 13/008,800 and 13/601,976, entitled "Composite Materials for Electrochemical Storage" and "Silicon Particles for Battery Electrodes," respectively, certain embodiments utilize a method of creating monolithic, self-supported anodes using a carbonized polymer. Because the polymer is converted into an electrically conductive and electrochemically active matrix, the resulting electrode is conductive enough that, in some embodiments, a metal foil or mesh current collector can be omitted or minimized. The converted polymer also acts as an expansion buffer for silicon particles during cycling so that a high cycle life can be achieved. In certain embodiments, the resulting electrode is an electrode that is comprised substantially of active material. In further embodiments, the resulting electrode is substantially active material. The electrodes can have a high energy density of between about 500 mAh/g to about 1200 mAh/g that can be due to, for example, 1) the use of silicon, 2) elimination or substantial reduction of metal current collectors, and 3) being comprised entirely or substantially entirely of active material.

As described herein and in U.S. patent application Ser. No. 14/800,380, entitled "Electrolyte Compositions for Batteries," the entirety of which is hereby incorporated by reference, composite materials can be used as an anode in most conventional Li-ion batteries; they may also be used as the cathode in some electrochemical couples with additional additives. The composite materials can also be used in either secondary batteries (e.g., rechargeable) or primary batteries (e.g., non-rechargeable). In some embodiments, the composite materials can be used in batteries implemented as a pouch cell, as described in further details herein. In certain embodiments, the composite materials are self-supported structures. In further embodiments, the composite materials are self-supported monolithic structures. For example, a collector may be included in the electrode comprised of the composite material. In certain embodiments, the composite material can be used to form carbon structures discussed in U.S. patent application Ser. No. 12/838,368 entitled "Carbon Electrode Structures for Batteries," the entirety of which is hereby incorporated by reference. Furthermore, the composite materials described herein can be, for example, silicon composite materials, carbon composite materials, and/or silicon-carbon composite materials.

In some embodiments, the largest dimension of the silicon particles can be less than about 40 μm, less than about 1 μm, between about 10 nm and about 40 μm, between about 10 nm and about 1 μm, less than about 500 nm, less than about 100 nm, and about 100 nm. All, substantially all, or at least some of the silicon particles may comprise the largest dimension described above. For example, an average or median largest dimension of the silicon particles can be less than about 40 μm, less than about 1 μm, between about 10 nm and about 40 μm, between about 10 nm and about 1 μm, less than about 500 nm, less than about 100 nm, and about 100 nm.

The amount of silicon in the composite material can be greater than zero percent by weight of the mixture and composite material. In certain embodiments, the mixture comprises an amount of silicon, the amount being within a range of from about 0% to about 95% by weight, including from about 30% to about 95% by weight of the mixture. The amount of silicon in the composite material can be within a range of from about 0% to about 35% by weight, including from about 0% to about 25% by weight, from about 10% to about 35% by weight, and about 20% by weight. In further certain embodiments, the amount of silicon in the mixture is at least about 30% by weight; greater than 0% and less than about 95% by weight; or between about 50% and about 95% by weight. Additional embodiments of the amount of silicon in the composite material include more than about 50% by weight, between about 30% and about 95% by weight, between about 50% and about 85% by weight, and between about 75% and about 95% by weight. In some embodiments, the anode is >80% Si; in other embodiments >85% Si; in further embodiments >90% Si.

Furthermore, the silicon particles may or may not be pure silicon. For example, the silicon particles may be substantially silicon or may be a silicon alloy. In one embodiment, the silicon alloy includes silicon as the primary constituent along with one or more other elements. In some embodiments, anodes may comprise different silicon-containing materials, including but not limited to, Si/graphite composite, Silicon oxide, Silicon oxide/graphite composite or Silicon nitride.

As described herein, micron-sized silicon particles can provide good volumetric and gravimetric energy density combined with good cycle life. In certain embodiments, to obtain the benefits of both micron-sized silicon particles (e.g., high energy density) and nanometer-sized silicon particles (e.g., good cycle behavior), silicon particles can have an average particle size in the micron range and a surface including nanometer-sized features. In some embodiments, the silicon particles have an average particle size (e.g., average diameter or average largest dimension) between about 0.1 μm and about 30 μm or between about 0.1 μm and all values up to about 30 μm. For example, the silicon particles can have an average particle size between about 0.5 μm and about 25 μm, between about 0.5 μm and about 20 μm, between about 0.5 μm and about 15 μm, between about 0.5 μm and about 10 μm, between about 0.5 μm and about 5 μm, between about 0.5 μm and about 2 μm, between about 1 μm and about 20 μm, between about 1 μm and about 15 μm, between about 1 μm and about 10 μm, between about 5 μm and about 20 μm, etc. Thus, the average particle size can be any value between about 0.1 μm and about 30 μm, e.g., 0.1 μm, 0.5 μm, 1 μm, 5 μm, 10 μm, 15 μm, 20 μm, 25 μm, and 30 μm.

The composite material can be formed by pyrolyzing a polymer precursor, such as polyamide acid. The amount of carbon obtained from the precursor can be about 50 weight percent by weight of the composite material. In certain embodiments, the amount of carbon from the precursor in the composite material is about 10% to about 25% by weight. The carbon from the precursor can be hard carbon. Hard carbon can be a carbon that does not convert into graphite even with heating over 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors can include phenolic resins, epoxy resins, and other polymers that have a very high melting point or are crosslinked. A soft carbon precursor can be used if it does not melt at the heat treatment temperatures used. In some embodiments, the amount of carbon in the composite material has a value within a range of from about 10% to about 25% by weight, about 20% by weight, or more than about 50% by weight. In some embodiments, there may be greater than 0% and less than about 90% by weight of one or more types of carbon phases. In certain embodiments, the carbon phase is substantially amorphous. In other embodiments, the carbon phase is substantially crystalline. In further embodiments, the carbon phase includes amorphous and crystalline carbon. The carbon phase can be a matrix phase in the composite material. The carbon can also be embedded in the pores of the additives including silicon. The carbon may react with some of the additives to create some materials at interfaces. For example, there may be a silicon carbide layer between the silicon particles and the carbon.

In certain embodiments, graphite particles are added to the mixture. Advantageously, graphite can be an electrochemically active material in the battery as well as an elastically deformable material that can respond to the volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, the largest dimension of the graphite particles is between about 0.5 microns and about 20 microns. All, substantially all, or at least some of the graphite particles may comprise the largest dimension described herein. In further embodiments, an average or median largest dimension of the graphite particles is between about 0.5 microns and about 20 microns. In certain embodiments, the mixture includes greater than 0% and less than about 80% by weight of graphite particles. In further embodiments, the composite material includes about 1% to about 20% by weight graphite particles. In further embodiments, the composite material includes about 40% to about 75% by weight graphite particles.

In certain embodiments, conductive particles which may also be electrochemically active are added to the mixture. Such particles can enable both a more electronically conductive composite as well as a more mechanically deformable composite capable of absorbing the large volumetric change incurred during lithiation and de-lithiation. In certain embodiments, a largest dimension of the conductive particles is between about 10 nanometers and about 7 millimeters. All, substantially all, or at least some of the conductive particles may comprise the largest dimension described herein. In further embodiments, an average or median largest dimension of the conductive particles is between about 10 nm and about 7 millimeters. In certain embodiments, the mixture includes greater than zero and up to about 80% by weight conductive particles. In further embodiments, the composite material includes about 45% to about 80% by weight conductive particles. The conductive particles can be conductive carbon including carbon blacks, carbon fibers, carbon nanofibers, carbon nanotubes, graphite, graphene, etc. Many carbons that are considered as conductive additives that are not electrochemically active become active once pyrolyzed in a polymer matrix. Alternatively, the conductive particles can be metals or alloys including copper, nickel, or stainless steel.

The composite material may also be formed into a powder. For example, the composite material can be ground into a powder. The composite material powder can be used as an active material for an electrode. For example, the composite material powder can be deposited on a collector in a manner similar to making a conventional electrode structure, as known in the industry.

In some embodiments, the full capacity of the composite material may not be utilized during the use of the battery in order to improve battery life (e.g., number charge and discharge cycles before the battery fails or the performance of the battery decreases below a usability level). For example, a composite material with about 70% by weight silicon particles, about 20% by weight carbon from a precursor, and about 10% by weight graphite may have a maximum gravimetric capacity of about 2000 mAh/g, while the composite material may only be used up to a gravimetric capacity of about 550 to about 850 mAh/g. Although, the maximum gravimetric capacity of the composite material may not be utilized, using the composite material at a lower capacity can still achieve a higher capacity than certain lithium-ion batteries. In certain embodiments, the composite material is used or only used at a gravimetric capacity below about 70% of the composite material's maximum gravimetric capacity. For example, the composite material is not used at a gravimetric capacity above about 70% of the composite material's maximum gravimetric capacity. In further embodiments, the composite material is used or only used at a gravimetric capacity below about 60% of the composite material's maximum gravimetric capacity or below about 50% of the composite material's maximum gravimetric capacity.

As described herein, a lithium-ion battery may include a first electrode, a second electrode, a separator between the first electrode and the second electrode, and an electrolyte in contact with the first electrode, the second electrode, and the separator. The electrolyte serves to facilitate ionic transport between the first electrode and the second electrode. In some embodiments, the first electrode and the second electrode can refer to anode and cathode or cathode and anode, respectively. Electrolytes and/or electrolyte compositions may be a liquid, solid, or gel. In some embodiments electrolytes are solid-state or quasi solid-state as disclosed herein, which may be present in one or more of the anode, cathode and/or separator.

In lithium-ion batteries, the most widely used electrolytes are non-aqueous liquid electrolytes; these may comprise a lithium-containing salt (e.g. $LiPF_6$) and low molecular weight carbonate solvents as well as various small amounts of functional additives. $LiPF_6$ holds a dominant position in commercial liquid electrolytes due to its well-balanced properties. However, $LiPF_6$ has problems such as high reactivity towards moisture and poor thermal stability. These issues are primarily attributed to the equilibrium decomposition reaction of $LiPF_6$. The P—F bond in $LiPF_6$ and $PF_5$ is rather labile towards hydrolysis by inevitable trace amounts of moisture in batteries. Besides, as a strong Lewis acid, $PF_5$ is also able to initiate reactions with carbonate solvents and causes further electrolyte degradation. Moreover, a temperature rise further accelerates the decomposition reaction of $LiPF_6$ and consequently promotes subsequent parasitic reactions. This is also a reason for faster aging of current lithium-ion batteries at elevated temperatures, as compared to room temperature.

In this disclosure solid or quasi-solid electrolyte compositions for a lithium-ion battery are described. These electrolytes may be used in Si-dominant anode//Ni-rich NCM or NCA cathode full cells. The electrolytes may be all solid-state single lithium-ion conducting polymer electrolytes; quasi solid-state single lithium-ion conducting polymer electrolytes; or single lithium-ion conducting polymer or polymer composite gel electrolytes. In one embodiment, the single lithium-ion conducting polymer electrolyte may be a lithiated-Nafion film. The described polymer electrolytes (including all-solid-state polymer electrolytes, quasi-solid polymer electrolytes or polymer gel electrolytes) are advantageous as they may overcome problems in Li-ion batteries caused by both organic liquid electrolytes (such as leakage of solvents, flammability, etc.) and/or inorganic solid-solid electrolytes (such as poor mechanical properties, low elastic moduli, etc.).

In some embodiments, the electrolyte may further comprise one or more additives. As used herein, an additive of the electrolyte refers to a component that makes up less than 10% by weight (wt %) of the electrolyte. In some embodiments, the amount of each additive in the electrolyte may be from about 0.2 wt % to about 1 wt %, 0.1 wt % to about 2 wt %, 0.2 wt % to about 9 wt %, from about 0.5 wt % to about 9 wt %, from about 1 wt % to about 9 wt %, from about 1 wt % to about 8 wt %, from about 1 wt % to about 8 wt %, from about 1 wt % to about 7 wt %, from about 1 wt % to about 6 wt %, from about 1 wt % to about 5 wt %, from about 2 wt % to about 5 wt %, or any value in between. In some embodiments, the total amount of the additive(s) may be from about 1 wt % to about 9 wt %, from about 1 wt % to about 8 wt %, from about 1 wt % to about 7 wt %, from about 2 wt % to about 7 wt %, or any value in between. In other embodiments, the percentages of additives may be expressed in volume percent (vol %). In some embodiments, the electrolyte composition may contain the additive at less than 10 weight %; or at less than 5 weight %. In other embodiments, the electrolyte composition may contain the compound as an additive at less than 1 wt % or less; in other embodiments, about 0.5 wt % or less or about 0.2 wt % or less is utilized.

The term "alkyl" refers to a straight or branched, saturated, aliphatic radical having the number of carbon atoms indicated. The alkyl moiety may be branched or straight chain. For example, C1-C6 alkyl includes, but is not limited to, methyl, ethyl, propyl, isopropyl, butyl, isobutyl, sec-butyl, tert-butyl, pentyl, isopentyl, hexyl, etc. Other alkyl groups include, but are not limited to heptyl, octyl, nonyl, decyl, etc. Alkyl can include any number of carbons, such as 1-2, 1-3, 1-4, 1-5, 1-6, 1-7, 1-8, 1-9, 1-10, 1-11, 1-12, 2-3, 2-4, 2-5, 2-6, 3-4, 3-5, 3-6, 4-5, 4-6 and 5-6. The alkyl group is typically monovalent, but can be divalent, such as when the alkyl group links two moieties together.

The term "fluoro-alkyl" refers to an alkyl group where one, some, or all hydrogen atoms have been replaced by fluorine.

The term "alkylene" refers to an alkyl group, as defined above, linking at least two other groups, i.e., a divalent hydrocarbon radical. The two moieties linked to the alkylene can be linked to the same atom or different atoms of the alkylene. For instance, a straight chain alkylene can be the bivalent radical of —(CH$_2$)$_n$—, where n is 1, 2, 3, 4, 5, 6, 7, 8, 9, or 10. Alkylene groups include, but are not limited to, methylene, ethylene, propylene, isopropylene, butylene, isobutylene, sec-butylene, pentylene and hexylene.

The term "alkoxy" refers to alkyl group having an oxygen atom that either connects the alkoxy group to the point of attachment or is linked to two carbons of the alkoxy group. Alkoxy groups include, for example, methoxy, ethoxy, propoxy, iso-propoxy, butoxy, 2-butoxy, iso-butoxy, sec-butoxy, tert-butoxy, pentoxy, hexoxy, etc. The alkoxy groups can be further substituted with a variety of substituents described within. For example, the alkoxy groups can be substituted with halogens to form a "halo-alkoxy" group, or substituted with fluorine to form a "fluoro-alkoxy" group.

The term "alkenyl" refers to either a straight chain or branched hydrocarbon of 2 to 6 carbon atoms, having at least one double bond. Examples of alkenyl groups include, but are not limited to, vinyl, propenyl, isopropenyl, 1-butenyl, 2-butenyl, isobutenyl, butadienyl, 1-pentenyl, 2-pentenyl, isopentenyl, 1,3-pentadienyl, 1,4-pentadienyl, 1-hexenyl, 2-hexenyl, 3-hexenyl, 1,3-hexadienyl, 1,4-hexadienyl, 1,5-hexadienyl, 2,4-hexadienyl, or 1,3,5-hexatrienyl. Alkenyl groups can also have from 2 to 3, 2 to 4, 2 to 5, 3 to 4, 3 to 5, 3 to 6, 4 to 5, 4 to 6 and 5 to 6 carbons. The alkenyl group is typically monovalent, but can be divalent, such as when the alkenyl group links two moieties together.

The term "alkenylene" refers to an alkenyl group, as defined above, linking at least two other groups, i.e., a divalent hydrocarbon radical. The two moieties linked to the alkenylene can be linked to the same atom or different atoms of the alkenylene. Alkenylene groups include, but are not limited to, ethenylene, propenylene, isopropenylene, butenylene, isobutenylene, sec-butenylene, pentenylene and hexenylene.

The term "alkynyl" refers to either a straight chain or branched hydrocarbon of 2 to 6 carbon atoms, having at least one triple bond. Examples of alkynyl groups include, but are not limited to, acetylenyl, propynyl, 1-butynyl, 2-butynyl, isobutynyl, sec-butynyl, butadiynyl, 1-pentynyl, 2-pentynyl, isopentynyl, 1,3-pentadiynyl, 1,4-pentadiynyl, 1-hexynyl, 2-hexynyl, 3-hexynyl, 1,3-hexadiynyl, 1,4-hexadiynyl, 1,5-hexadiynyl, 2,4-hexadiynyl, or 1,3,5-hexatriynyl. Alkynyl groups can also have from 2 to 3, 2 to 4, 2 to 5, 3 to 4, 3 to 5, 3 to 6, 4 to 5, 4 to 6 and 5 to 6 carbons. The alkynyl group is typically monovalent, but can be divalent, such as when the alkynyl group links two moieties together.

The term "alkynylene" refers to an alkynyl group, as defined above, linking at least two other groups, i.e., a divalent hydrocarbon radical. The two moieties linked to the alkynylene can be linked to the same atom or different atoms of the alkynylene. Alkynylene groups include, but are not limited to, ethynylene, propynylene, butynylene, sec-butynylene, pentynylene, and hexynylene.

The term "cycloalkyl" refers to a saturated or partially unsaturated, monocyclic, fused bicyclic, bridged polycyclic, or spiro ring assembly containing from 3 to 12, from 3 to 10, or from 3 to 7 ring atoms, or the number of atoms indicated. Monocyclic rings include, for example, cyclopropyl, cyclobutyl, cyclopentyl, cyclohexyl, and cyclooctyl. Bicyclic and polycyclic rings include, for example, norbornane, decahydronaphthalene and adamantane. For example, C3-C8 cycloalkyl includes cyclopropyl, cyclobutyl, cyclopentyl, cyclohexyl, cyclooctyl, and norbornane. As used herein, the term "fused" refers to two rings which have two atoms and one bond in common. For example, in the following structure, rings A and B are fused

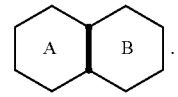

As used herein, the term "bridged polycyclic" refers to compounds wherein the cycloalkyl contains a linkage of one or more atoms connecting non-adjacent atoms. The following structures

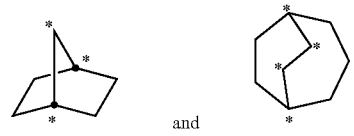 [SMILES: C1C[C@H]2CC[C@H]1C2 ; C1CC2CCC(C1)CC2]

and are examples of "bridged" rings. As used herein, the term "spiro" refers to two rings that have one atom in common and the two rings are not linked by a bridge. Examples of fused cycloalkyl groups are decahydronaphthalenyl, dodecahydro-1H-phenalenyl and tetradecahydroanthracenyl; examples of bridged cycloalkyl groups are bicyclo[1.1.1]pentyl, adamantanyl, and norbornanyl; and examples of spiro cycloalkyl groups include spiro[3.3]heptane and spiro[4.5]decane.

The term "cycloalkylene" refers to a cycloalkyl group, as defined above, linking at least two other groups, i.e., a divalent hydrocarbon radical. The two moieties linked to the cycloalkylene can be linked to the same atom or different atoms of the cycloalkylene. Cycloalkylene groups include, but are not limited to, cyclopropylene, cyclobutylene, cyclopentylene, cyclohexylene, and cyclooctylene.

The term "aryl" refers to a monocyclic or fused bicyclic, tricyclic or greater, aromatic ring assembly containing 6 to 16 ring carbon atoms. For example, aryl may be phenyl, benzyl or naphthyl, preferably phenyl. Aryl groups may include fused multicyclic ring assemblies wherein only one ring in the multicyclic ring assembly is aromatic. Aryl groups can be mono-, di-, or tri-substituted by one, two or three radicals. Preferred as aryl is naphthyl, phenyl, or phenyl mono- or disubstituted by alkoxy, phenyl, halogen, alkyl or trifluoromethyl, especially phenyl or phenyl-mono- or disubstituted by alkoxy, halogen or trifluoromethyl, and in particular phenyl.

The term "arylene" refers to an aryl group, as defined above, linking at least two other groups. The two moieties linked to the arylene are linked to different atoms of the arylene. Arylene groups include, but are not limited to, phenylene.

The term "heteroaryl" refers to a monocyclic or fused bicyclic or tricyclic aromatic ring assembly containing 5 to 16 ring atoms, where from 1 to 4 of the ring atoms are a heteroatom such as N, O, or S. For example, heteroaryl includes pyridyl, indolyl, indazolyl, quinoxalinyl, quinolinyl, isoquinolinyl, benzothienyl, benzofuranyl, furanyl, pyrrolyl, thiazolyl, benzothiazolyl, oxazolyl, isoxazolyl, triazolyl, tetrazolyl, pyrazolyl, imidazolyl, thienyl, or any other radicals substituted, especially mono- or di-substituted, by e.g. alkyl, nitro or halogen. Pyridyl represents 2-, 3- or 4-pyridyl, advantageously 2- or 3-pyridyl. Thienyl represents 2- or 3-thienyl. Quinolinyl represents preferably 2-, 3- or 4-quinolinyl. Isoquinolinyl represents preferably 1-, 3- or 4-isoquinolinyl. Benzopyranyl, benzothiopyranyl represents preferably 3-benzopyranyl or 3-benzothiopyranyl, respectively. Thiazolyl represents preferably 2- or 4-thiazolyl, and most preferred 4-thiazolyl. Triazolyl is preferably 1-, 2- or 5-(1,2,4-triazolyl). Tetrazolyl is preferably 5-tetrazolyl.

Preferably, heteroaryl is pyridyl, indolyl, quinolinyl, pyrrolyl, thiazolyl, isoxazolyl, triazolyl, tetrazolyl, pyrazolyl, imidazolyl, thienyl, furanyl, benzothiazolyl, benzofuranyl, isoquinolinyl, benzothienyl, oxazolyl, indazolyl, or any of the radicals substituted, especially mono- or di-substituted.

The term "heteroalkyl" refers to an alkyl group having from 1 to 3 heteroatoms such as N, O and S. The heteroatoms can also be oxidized, such as, but not limited to, —S(O)— and —S(O)$_2$—. For example, heteroalkyl can include ethers, thioethers, alkyl-amines and alkyl-thiols.

The term "heteroalkylene" refers to a heteroalkyl group, as defined above, linking at least two other groups. The two moieties linked to the heteroalkylene can be linked to the same atom or different atoms of the heteroalkylene.

The term "heterocycloalkyl" refers to a ring system having from 3 ring members to about 20 ring members and from 1 to about 5 heteroatoms such as N, O and S. The heteroatoms can also be oxidized, such as, but not limited to, —S(O)— and —S(O)$_2$—. For example, heterocycle includes, but is not limited to, tetrahydrofuranyl, tetrahydrothiophenyl, morpholino, pyrrolidinyl, pyrrolinyl, imidazolidinyl, imidazolinyl, pyrazolidinyl, pyrazolinyl, piperazinyl, piperidinyl, indolinyl, quinuclidinyl and 1,4-dioxa-8-aza-spiro[4.5]dec-8-yl.

The term "heterocycloalkylene" refers to a heterocyclalkyl group, as defined above, linking at least two other groups. The two moieties linked to the heterocycloalkylene can be linked to the same atom or different atoms of the heterocycloalkylene.

The term "optionally substituted" is used herein to indicate a moiety that can be unsubstituted or substituted by one or more substituent. When a moiety term is used without specifically indicating as substituted, the moiety is unsubstituted.

In accordance with the disclosure, various single lithium-ion conducting polymer electrolytes (including all-solid-state polymer electrolytes, quasi-solid polymer electrolytes or polymer gel electrolytes) may be used in Si-dominant anode containing full cells with a variety of cathodes. In some embodiments, these electrolyte materials can be all solid-state single lithium-ion conducting polymer electrolytes; quasi solid-state single lithium-ion conducting polymer electrolytes; or single lithium-ion conducting polymer/polymer composite gel electrolytes. In other embodiments, materials such as organic-inorganic hybrid materials or blended polymer materials may be utilized as single lithium-ion conducting polymer electrolytes.

Examples of single lithium-ion conducting polymer electrolytes include, but are not limited to, organic homopolymers, random copolymers, block copolymers, graft copolymers, triblock copolymer, etc., containing sulfonylimide ($-SO_2N^{(-)}SO_2-$) anions interacting with $Li^+$ cations as all solid-state single lithium-ion conducting polymer electrolytes; quasi solid-state single lithium-ion conducting polymer electrolytes; or single lithium-ion conducting polymer or polymer composite gel electrolytes in Si-dominant anode//Ni-rich NCM or NCA cathode full cells. These polymers include, but are not limited to lithium poly[(4-styrenesulfonyl) (fluorosulfonyl)imide] (LiPSFSI), lithium poly[(4-styrenesulfonyl)(trifluoromethanesulfonyl)imide] (LiPSTFSI), etc.

Example structures are shown below:

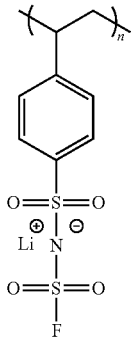

lithium poly[(4-styrenesulfonyl) (fluorosulfonyl)imide] (LiPSFSI)

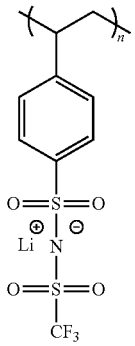

lithium poly[(4-styrenesulfonyl) (trifluoromethanesulfonyl)imide] (LiPSTFSI).

Examples of single lithium-ion conducting polymer electrolytes include, but are not limited to, organic homopolymers, random copolymers, block copolymers, graft copolymers, triblock copolymer, etc., containing sulfonate ($-SO_3$) anions interacting with $Li^+$ cations as all solid-state single lithium-ion conducting polymer electrolytes; quasi solid-state single lithium-ion conducting polymer electrolytes; or single lithium-ion conducting polymer or polymer composite gel electrolytes for Si-dominant anode//Ni-rich NCM or NCA cathode full cells. These polymers include, but are not limited to lithium poly(4-styrenesulfonate) (LiPSS) and others.

Example structures are shown below:

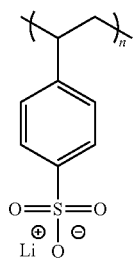

lithium poly(4-styrenesulfonate) (LiPSS).

Examples of single lithium-ion conducting polymer electrolytes include, but are not limited to, organic homopolymers, random copolymers, block copolymers, graft copolymers, triblock copolymer, etc., containing carboxylate anions (—$CO^{2-}$) interacting with $Li^+$ cations as all solid-state single lithium-ion conducting polymer electrolytes; quasi solid-state single lithium-ion conducting polymer electrolytes; or single lithium-ion conducting polymer or polymer composite gel electrolytes for Si-dominant anode//Ni-rich NCM or NCA cathode full cells. These polymers include, but are not limited to poly[(o-carboxy)oligo(oxyethylene) methacrylate], copolymer of oligo(oxyethylene) methacrylate and lithium methacrylate, copolymer of oligo(oxyethylene) methacrylate and lithium acrylamidocaproate, and others.

Example structures are shown below:

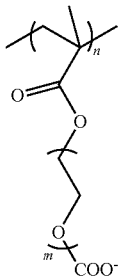

poly[(o-carboxy)oligo(oxyethylene) methacrylate]

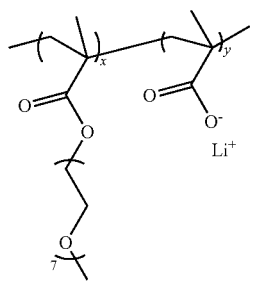

copolymer of oligo(oxyethylene) methacrylate and lithium methacrylate

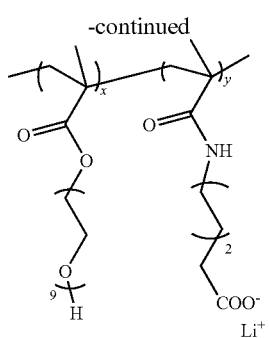

copolymer of oligo(oxyethylene) methacrylate and lithium acrylamidocaproate.

Examples of single lithium-ion conducting polymer electrolytes include, but are not limited to, organic homopolymers, random copolymers, block copolymers, graft copolymers, triblock copolymer, etc., containing types of anions such as boron, phosphorus, etc., as center atoms interacting with $Li^+$ cations as all solid-state single lithium-ion conducting polymer electrolytes; quasi solid-state single lithium-ion conducting polymer electrolytes; or single lithium-ion conducting polymer or polymer composite gel electrolytes for Si-dominant anode//Ni-rich NCM or NCA cathode full cells.

Organic-inorganic hybrid materials can also be utilized as single lithium-ion conducting polymer electrolytes. Examples of these materials as all solid-state single lithium-ion conducting polymer electrolytes; quasi solid-state single lithium-ion conducting polymer electrolytes; or single lithium-ion conducting polymer or polymer composite gel electrolytes for Si-dominant anode//Ni-rich NCM or NCA cathode full cells include, but are not limited to aluminate-based hybrid materials, siloxyaluminate-based hybrid materials, and thioaluminate-based hybrid materials.

Example structures are shown below:

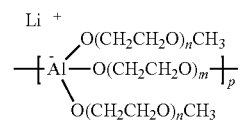

aluminate-based hybrid material

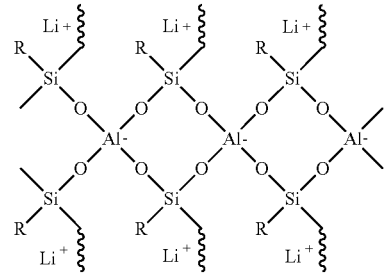

siloxyaluminate-based hybrid material

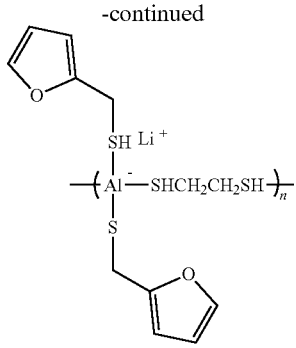

thioaluminate-based hybrid material.

Blended polymer materials can also be utilized as single lithium-ion conducting polymer electrolytes. These materials are various secondary polymers which may be blended with the aforementioned organic homopolymers, random copolymers, block copolymers, graft copolymers, triblock copolymer, etc., containing different types of anions interacting with $Li^+$ cations, which may be used as all solid-state single lithium-ion conducting polymer electrolytes; quasi solid-state single lithium-ion conducting polymer electrolytes; or single lithium-ion conducting polymer or polymer composite gel electrolytes for Si-dominant anode//Ni-rich NCM or NCA cathode full cells. These secondary polymers include, but are not limited to, polyethylene oxide (PEO); poly(vinylidene fluoride)-co-hexafluoropropylene (PVDF-HFP); Polyacrylonitrile (PAN); Poly(arylic acid) (PAA, Poly (vinyl alcohol) (PVA) networked cellulose, Polyimide (PI) polyamide-imide (PAI), polysiloxane-based polymers, and/ or Poly(methyl methacrylate) (PMMA), etc.

In some embodiments, the polymer electrolyte as described above may be a compound with one or more functional substituents (groups, moieties). The polymers described herein may be further substituted with substituents selected from the group consisting of H, OH, F, alkyl, fluoro-alkyl, alkylene, alkoxy, alkenyl, alkenylene, alkynyl, alkynylene, cycloalkyl, cycloalkylene, aryl, arylene, heteroaryl, heteroalkyl, heteroalkylene, heterocycloalkyl, and heterocycloalkylene, as defined above, which may be also further optionally substituted, such as alkyl optionally substituted by F, CN, $CF_3$; or a combination thereof. The compound may also contain other heterogeneous atoms in the structure, such as sulfur, oxygen, Si, P, or others.

Substituents may be one or more alkenyl, alkenylene, alkynyl, alkynylene, cycloalkyl, cycloalkylene, aryl, arylene or heteroaryl substituents, which are substituted by H, alkyl, fluoro-alkyl, alkylene, alkoxy, alkenyl, alkenylene, alkynyl, alkynylene, cycloalkyl, cycloalkylene, aryl, arylene, heteroaryl, heteroalkyl, heteroalkylene, heterocycloalkyl, and heterocycloalkylene, as described above, and which may be also further optionally substituted.

In some embodiments, the polymers may have additional functional groups. The functional groups can be —NH, —$NH_2$, alkenyl, heteroalkenyl, alkynyl, heteroalkynyl, alkyl optionally substituted by —F, —$CF_3$ or heterocycloalkyl, a cycloalkyl, a heterocycloalkyl, etc. Some of these modifications may also include the use of alkyl substituents, aromatic sub-cyclic units, nitrogen, silicon, and/or sulfur atoms substituted for oxygen in the macrocyclic ring and other changes or combinations thereof.

Further additives may be used with the aforementioned organic homopolymers, random copolymers, block copolymers, graft copolymers, triblock copolymer, etc., containing different types of anions interacting with $Li^+$ cations, which may be used as all solid-state single lithium-ion conducting polymer electrolytes; quasi solid-state single lithium-ion conducting polymer electrolytes; or single lithium-ion conducting polymer or polymer composite gel electrolytes for Si-dominant anode//Ni-rich NCM or NCA cathode full cells. These additives include, but are not limited to, inorganic nanofillers and inorganic solid-state electrolytes (active ceramic particles). Inorganic nanofillers include, but are not limited to, $SiO_2$, $Al_2O_3$, $TiO_2$, NiO, CuO, $CeO_2$, $Sm_2O_3$, other metal oxides, metal-organic frameworks (MOFs), etc. Inorganic solid-state electrolytes (active ceramic particles) include, but are not limited to, LISICON-type ceramics, sodium superionic conductors (NASICONs)-type ceramics, Garnet-like structural ceramics, oxide based perovskite-type ceramics, sulfide based glassy and glass-ceramics, Thio-LiSICONS ceramics, LiPON-based ceramic, Li argyrodite, $Li3PO4$, $Li3N$, Li halide, Li hydride, etc.

In a further embodiment, Li-Nafion films can also be utilized as single Li-ion conducting polymer electrolytes for Li-ion half or full cells. These films comprise Nafion films where the mobile protons are replaced with Li ions. In one embodiment, these lithiated-Nafion films may be used as all solid-state single lithium-ion conducting polymer electrolytes; quasi solid-state single lithium-ion conducting polymer electrolytes; or single lithium-ion conducting polymer or polymer composite gel electrolytes for Si-dominant anode//Ni-rich NCM or NCA cathode full cells. In some embodiments, nafion-115 membranes may be utilized.

Methods for making the Li-Nafion films comprise the following steps: Nafion-115 membrane samples may be preliminarily treated in a 3 wt % $H_2O_2$ solution at 60-80° C. for 2 h, and rinsed with DI water; and then may be treated in 0.1M HCl at 60-80° C. for 2 h, and again thoroughly rinsed with DI water. In order to replace mobile protons with Li ions, the rinsed Nafion-115 membranes may be treated in a 2M LiGH (dissolved in $H_2O$/Alcohol (1/1 v/v)) solution for 4 h at 60-80° C. (Scheme 1), and then thoroughly rinsed with DI water. After that, Li-Nafion membranes may be punched to suitable size for use in cells. To remove water, punched Li-Nafion membranes may be dried at 120° C. for 24 hours and finally stored in a glove box until use.

Scheme 1

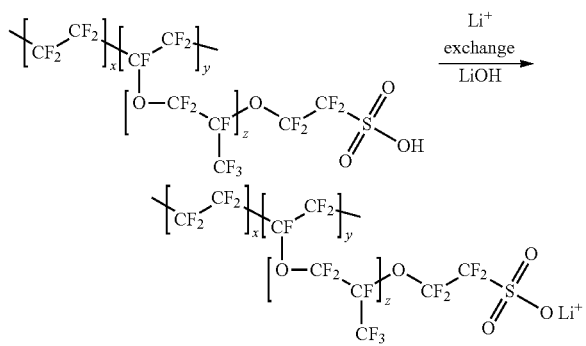

In some embodiments, Nafion perfluorinated membranes may be utilized as single Li-ion conducting polymer electrolytes (solid-state electrolytes) for Si dominant anode-based Li-ion batteries. To create these membranes, punched Li-Nafion-115 membranes are placed into a dimethyl sulfoxide (DMSO) solvent and kept at 60° C. for 3 days in a glove box. Extra DMSO is removed to obtain swelled Li-Nafion films. The DMSO swollen Li-Nafion films may be placed into a FEC/EMC (3/7 wt %) mixing solvent and then directly used as solid electrolyte (and separator) to build coin cells. In one embodiment, cells are built using an extra 70 µml FEC/EMC (3/7 wt %) mixing solvent. In further embodiments, the cells are built without any Li salts.

In a similar experiment, Nafion perfluorinated membranes may be created by placing punched Li-Nafion-115 membranes are placed into a propylene carbonate (PC) solvent and kept at 60° C. for 3 days in a glove box. Extra PC is removed to obtain swelled Li-Nafion films. The PC swollen Li-Nafion films may be placed into a FEC/EMC (3/7 wt %) mixing solvent and then directly used as the solid electrolyte (and separator) to build coin cells. In one embodiment, cells are built using an extra 80 µml FEC/EMC (3/7 wt %) mixing solvent. In another embodiment, cells are built using an extra 80 µml FEC/PC/EMC (2/1/7 wt %) mixing solvent. In further embodiments, the cells are built without any Li salts.

Figure 2:
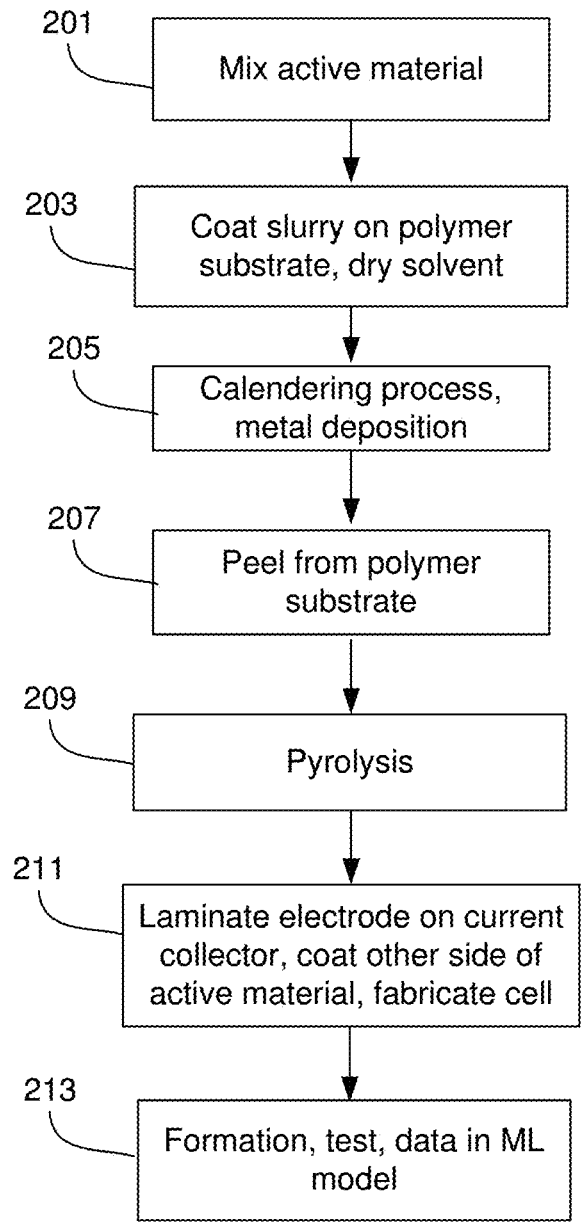
FIG. 2 is a flow diagram of a lamination process for forming a silicon-dominant anode cell, in accordance with an example embodiment of the disclosure.
Figure 3:
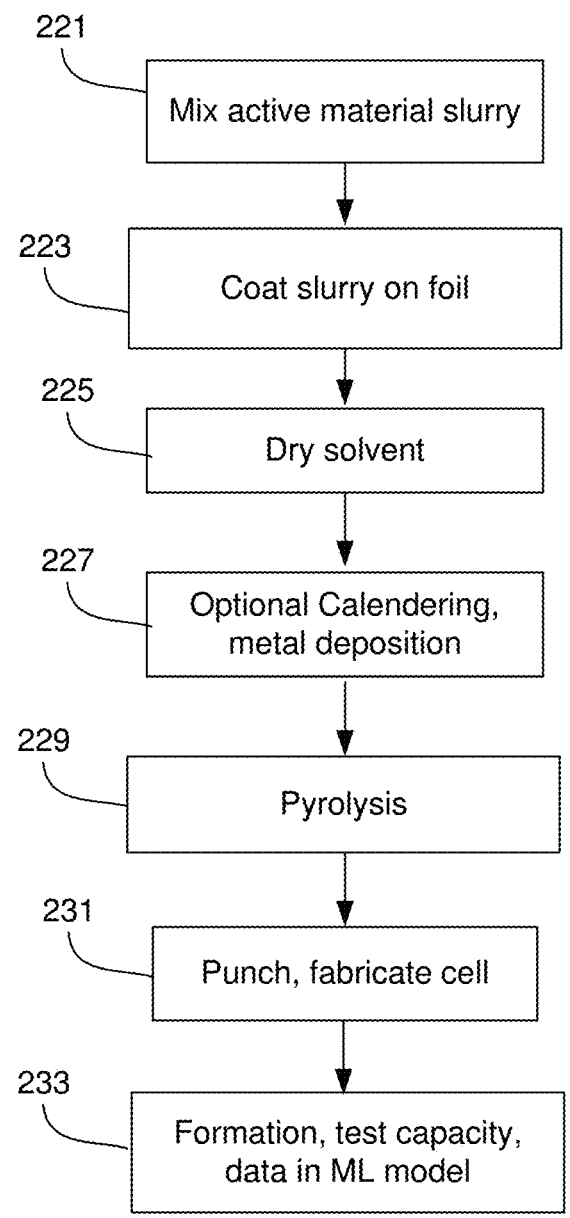
FIG. 3 is a flow diagram of a direct coating process for forming a silicon-dominant anode cell, in accordance with an example embodiment of the disclosure.

FIG. 2A is a flow diagram of a lamination process for forming a silicon-dominant anode cell, in accordance with an example embodiment of the disclosure. This process employs a high-temperature pyrolysis process on a substrate, layer removal, and a lamination process to adhere the active material layer to a current collector. This strategy may also be adopted by other anode-based cells, such as graphite, conversion type anodes, such as transition metal oxides, transition metal phosphides, and other alloy type anodes, such as Sn, Sb, Al, P, etc.

The raw electrode active material is mixed in step 201. In the mixing process, the active material may be mixed with a binder/resin (such as water-soluble PI, PAI, Phenolic or other water-soluble resins and mixtures and combinations thereof), solvent, rheology modifiers, surfactants, pH modifiers, and conductive additives. The materials may comprise carbon nanotubes/fibers, graphene sheets, metal polymers, metals, semiconductors, and/or metal oxides, for example. In one embodiment, silicon powder with a 1-30 or 5-30 µm particle size, for example, may then be dispersed in polyamic acid resin, polyamideimide, or polyimide (15-25% solids in N-Methyl pyrrolidone (NMP) or DI water) at, e.g., 1000 rpm for, e.g., 10 minutes, and then the conjugated carbon/solvent slurry may be added and dispersed at, e.g., 2000 rpm for, e.g., 10 minutes to achieve a slurry viscosity within 2000-4000 cP and a total solid content of about 30-40%. The pH of the slurry can be varied from acidic to basic, which may be beneficial for controlling the solubility, conformation, or adhesion behavior of water-soluble polyelectrolytes, such as polyamic acid, carboxymethyl cellulose, or polyacrylic acid. Ionic or non-ionic surfactants may be added to facilitate the wetting of the insoluble components of the slurry or the substrates used for coating processes The particle size and mixing times may be varied to configure the electrode coating layer density and/or roughness. Furthermore, cathode electrode coating layers may be mixed in step 201, where the electrode coating layer may comprise lithium cobalt oxide (LCO), lithium iron phosphate, lithium nickel cobalt manganese oxide (NMC), Ni-rich lithium nickel cobalt aluminum oxide (NCA), lithium manganese oxide (LMO), lithium nickel manganese spinel, LFP, Li-rich layer cathodes, LNMO or similar materials or combinations thereof, mixed with carbon precursor and additive as described above for the anode electrode coating layer.

In step 203, the slurry may be coated on a substrate. In this step, the slurry may be coated onto a Polyester, polyethylene terephthalate (PET), or Mylar film at a loading of, e.g., 2-4 mg/cm$^2$ and then undergo drying to an anode coupon with high Si content and less than 15% residual solvent content. This may be followed by an optional calendering process in step 205, where a series of hard pressure rollers may be used to finish the film/substrate into a smoother and denser sheet of material.

In step 207, the green film may then be removed from the PET, where the active material may be peeled off the polymer substrate, the peeling process being optional for a polypropylene (PP) substrate since PP can leave ~2% char residue upon pyrolysis. The peeling may be followed by a pyrolysis step 209 where the material may be heated to 600-1250 C for 1-3 hours, cut into sheets, and vacuum dried using a two-stage process (120° C. for 15 h, 220° C. for 5 h).

In step 211, the electrode material may be laminated on a current collector. For example, a 5-20 µm thick copper foil may be coated with polyamide-imide with a nominal loading of, e.g., 0.2-0.6 mg/cm$^2$ (applied as a 6 wt % varnish in NMP and dried for, e.g., 12-18 hours at, e.g., 110° C. under vacuum). The anode coupon may then be laminated on this adhesive-coated current collector. In an example scenario, the silicon-carbon composite film is laminated to the coated copper using a heated hydraulic press. An example lamination press process comprises 30-70 seconds at 300° C. and 3000-5000 psi, thereby forming the finished silicon-composite electrode.

In step 213, the cell may be assessed before being subject to a formation process. The measurements may comprise impedance values, open-circuit voltage, and thickness measurements. During formation, the initial lithiation of the anode may be performed, followed by delithiation. Cells may be clamped during formation and/or early cycling. The formation cycles are defined as any type of charge/discharge of the cell that is performed to prepare the cell for general cycling and is considered part of the cell production process. Different rates of charge and discharge may be utilized in the formation steps.

FIG. 2B is a flow diagram of a direct coating process for forming a silicon-dominant anode cell, in accordance with an example embodiment of the disclosure. This process comprises physically mixing the active material, conductive additive, and binder together, and coating it directly on a current collector before pyrolysis. This example process comprises a direct coating process in which an anode or cathode slurry is directly coated on a copper foil using a binder such as CMC, SBR, PAA, Sodium Alginate, PAI, PI and mixtures and combinations thereof.

In step 221, the active material may be mixed, e.g., a binder/resin (such as PI, PAI or phenolic), solvent (such as NMP, DI water, or other environmentally benign solvents or their mixtures and combinations thereof), and conductive additives. The materials may comprise carbon nanotubes/fibers, graphene sheets, metal polymers, metals, semiconductors, and/or metal oxides, for example. Silicon powder with a 1-30 µm particle size, for example, may then be dispersed in polyamic acid resin, polyamideimide, polyimide (15% solids in DI water or N-Methyl pyrrolidone (NMP)) at, e.g., 1000 rpm for, e.g., 10 minutes, and then the conjugated carbon/solvent slurry may be added and dispersed at, e.g., 2000 rpm for, e.g., 10 minutes to achieve a slurry viscosity within 2000-4000 cP and a total solid content of about 30-40%.

Furthermore, cathode active materials may be mixed in step 221, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 223, the slurry may be coated on copper foil. In the direct coating process described here, an anode slurry is coated on a current collector with residual solvent followed by a calendering process for densification followed by pyrolysis (~500-800° C.) such that carbon precursors are partially or completely converted into glassy carbon or pyrolytic carbon. Similarly, cathode active materials may be coated on a foil material, such as aluminum, for example. The active material layer may undergo drying in step 225 resulting in reduced residual solvent content. An optional calendering process may be utilized in step 227 where a series of hard pressure rollers may be used to finish the film/substrate into a smoother and denser sheet of material. In step 227, the foil and coating proceed through a roll press for lamination.

In step 229, the active material may be pyrolyzed by heating to 500-1000° C. such that carbon precursors are partially or completely converted into glassy carbon. Pyrolysis can be done either in roll form or after punching. If done in roll form, the punching is done after the pyrolysis process. The pyrolysis step may result in an anode active material having silicon content greater than or equal to 50% by weight, where the anode has been subjected to heating at or above 400 degrees Celsius. In an example scenario, the anode active material layer may comprise 20 to 95% silicon and in yet another example scenario may comprise 50 to 95% silicon by weight. In instances where the current collector foil is not pre-punched/pre-perforated, the formed electrode may be perforated with a punching roller, for example. The punched electrodes may then be sandwiched with a separator and electrolyte to form a cell.

In step 233, the cell may be assessed before being subject to a formation process. The measurements may comprise impedance values, open-circuit voltage, and thickness measurements. During formation, the initial lithiation of the anode may be performed, followed by delithiation. Cells may be clamped during formation and/or early cycling. The formation cycles are defined as any type of charge/discharge of the cell that is performed to prepare the cell for general cycling and is considered part of the cell production process. Different rates of charge and discharge may be utilized in the formation steps.

In some aspects, energy storage devices such as batteries are provided. In some embodiments, the energy storage device includes a first electrode and a second electrode, wherein at least one of the first electrode and the second electrode is a Si-based electrode. In some embodiments, the energy storage device includes a separator between the first electrode and the second electrode. In some embodiments, the energy storage device includes an electrolyte, which may be provided as an electrolyte composition and may comprise the all solid-state single lithium-ion conducting polymer electrolytes; quasi solid-state single lithium-ion conducting polymer electrolytes; and/or single lithium-ion conducting polymer or polymer composite gel electrolytes described herein.

In some embodiments, the second electrode is a Si-dominant electrode. In some embodiments, the second electrode comprises a self-supporting composite material film. In some embodiments, the composite material film comprises greater than 0% and less than about 95% by weight of silicon particles, and greater than 0% and less than about 90% by weight of one or more types of carbon phases, wherein at least one of the one or more types of carbon phases is a substantially continuous phase that holds the composite material film together such that the silicon particles are distributed throughout the composite material film.

In some embodiments, the battery may be capable of at least 200 cycles with more than 80% cycle retention when cycling with a C-rate of >2 C cycling between an upper voltage of >4V and a lower cut-off voltage of <3.3V. In other embodiments, the battery may be capable of at least 200 cycles with more than 80% cycle retention when cycling with a C-rate of >2 C cycling between an upper voltage of >4V and a lower cut-off voltage of <3.3V.

Example devices and processes for device fabrication are generally described below, and the performances of lithium-ion batteries with different electrodes and/or electrolytes may be evaluated. Additionally, properties of the single lithium-ion conducting polymer electrolytes also may be evaluated.

Tests may be carried out using the above-described Nafion perfluorinated membranes which are utilized as single Li-ion conducting polymer electrolytes (solid state electrolytes) for Si dominant anode-based Li-ion batteries.

Figure 4A:
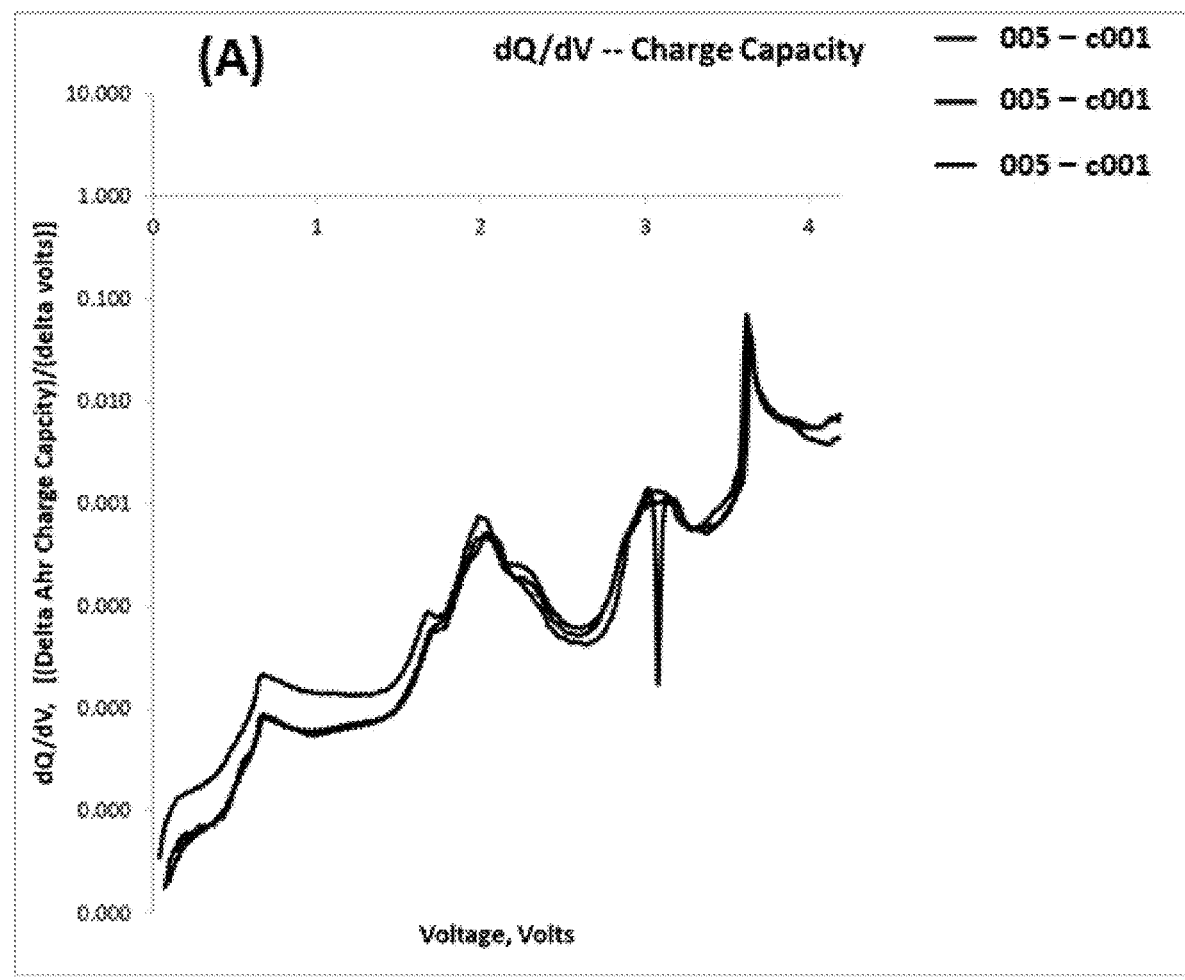
FIGS. 4A and 4B show dQ/dV—During Charge (FIG. 4A) and dQ/dV—During Discharge (FIG. 4B) curves of Si-dominant anode//NCM622 cathode full coin cells tested at 60° C. with a DMSO swollen Li-Nafion film (plus 100 μl FEC/EMC (3/7 wt %)) as an electrolyte, in accordance with an example embodiment of the disclosure.
Figure 4B:
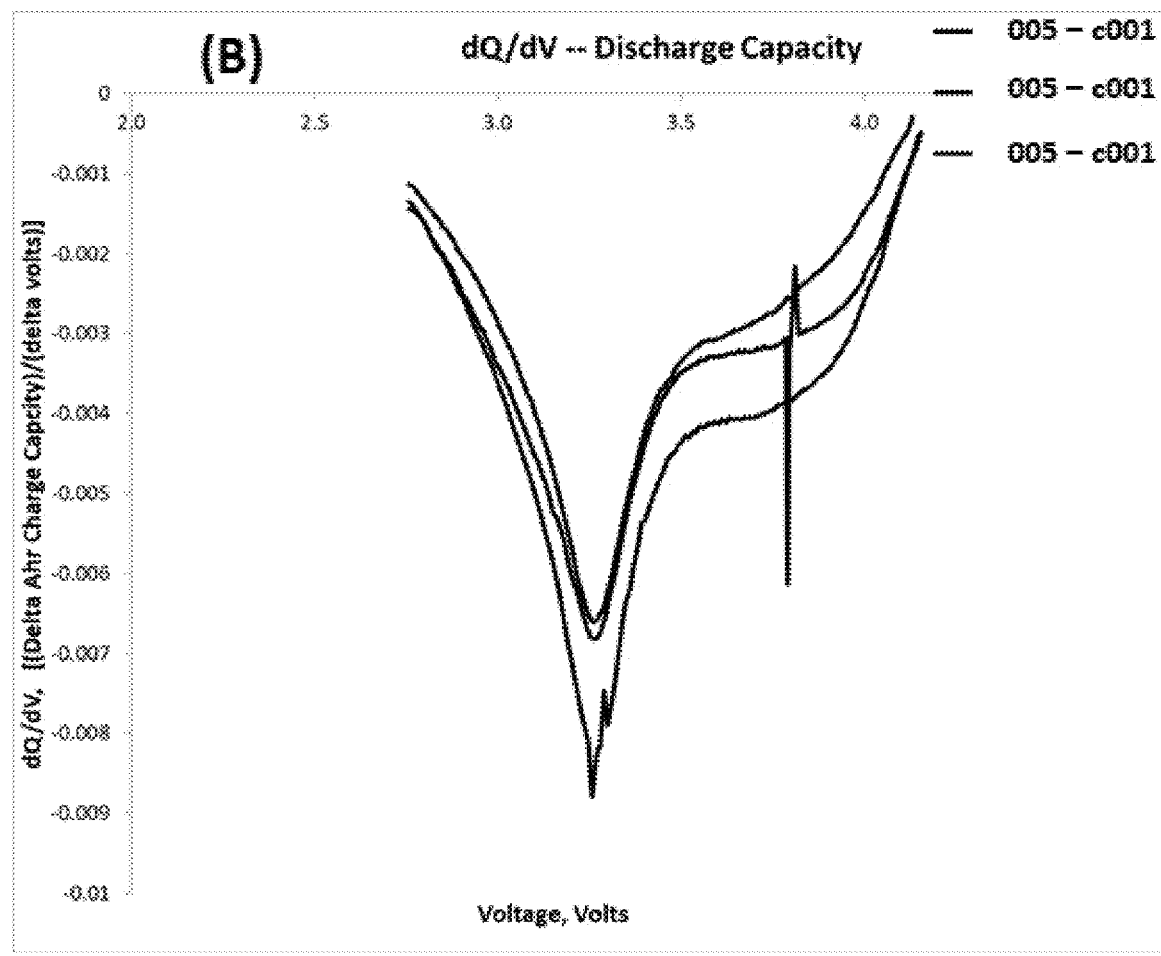

FIG. 4. dQ/dV—During Charge (4A) and dQ/dV—During Discharge (4B) curves of Si-dominant anode//NCM622 cathode full coin cells tested at 60° C. The electrolyte used may be DMSO swollen Li-Nafion film plus 100 μl FEC/EMC (3/7 wt %)-based liquid electrolyte solvent. The average thickness of the DMSO swollen Li-Nafion film may be about 60 μm. The Si-dominant anodes contain about 80 wt % Si, 5 wt % graphite and 15 wt % glassy carbon (from resin), and may be laminated on 15 μm Cu foil. The average loading may be about 2-5 mg/cm$^2$. The cathodes contain about 92 wt % NCM622, 4 wt % Super P and 4 wt % PVDF5130, and may be coated on 15 μm Al foil. The average loading may be about 20-30 mg/cm$^2$.

The dQ/dV data may be obtained through the following testing protocol: Charge at 0.025 C to 4.2 V, rest 5 minutes, discharge at 0.025 C to 2.75 V, rest 5 minutes.

The 1st formation cycle dQ/dV curves in FIG. 4 show that there are several clear reduction peaks in the these Si-dominant anode//NCM622 cathode quasi-solid cells using the Li-Nafion-based single lithium-ion conducting solid polymer electrolytes of the disclosure.

Figure 5A:
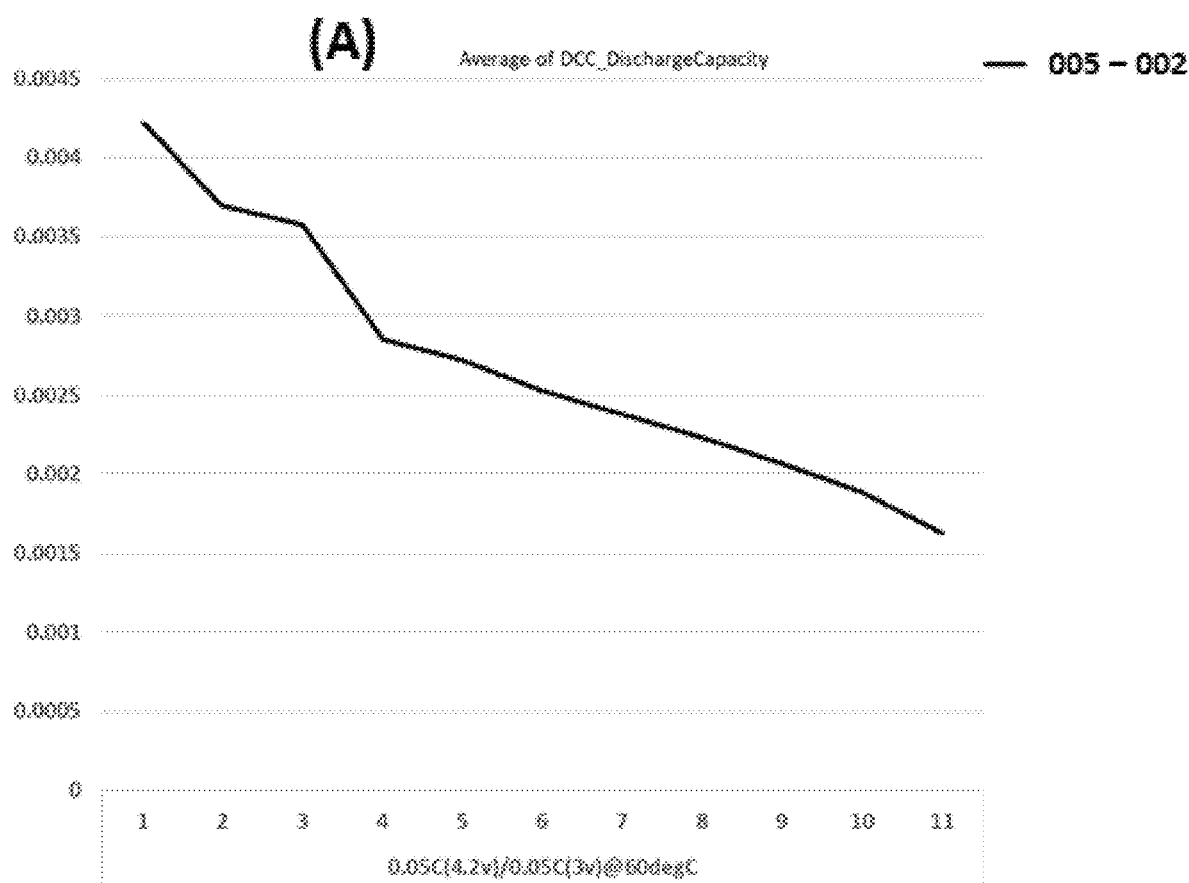
FIGS. 5A and 5B show the Capacity retention (FIG. 5A) and Normalized capacity retention (FIG. 5B) of Si-dominant anode//NCM811 cathode coin full cells tested at 60° C. with a DMSO swollen Li-Nafion film (plus 100 μl FEC/EMC (3/7 wt %)) as electrolyte, in accordance with an example embodiment of the disclosure.
Figure 5B:
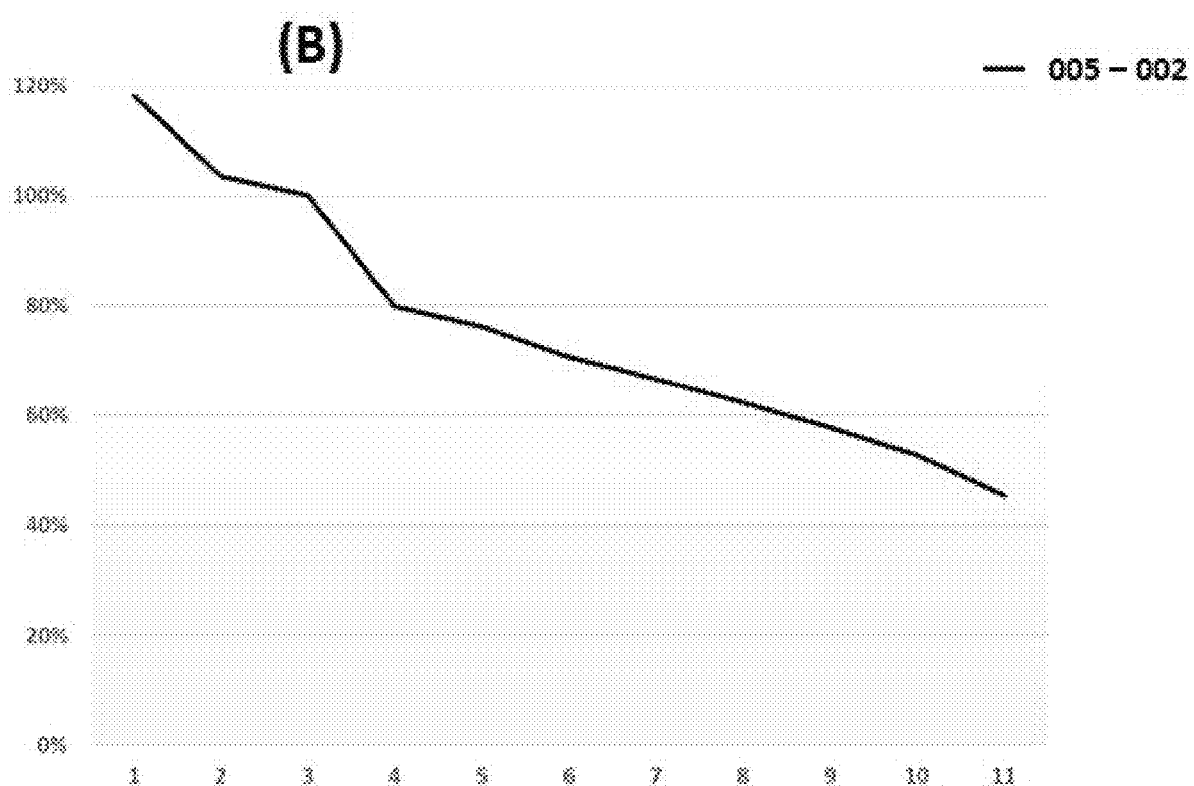

FIG. 5. Capacity retention (FIG. 5A) and Normalized capacity retention (FIG. 5B) of Si-dominant anode//NCM622 cathode full coin cells tested at 60° C. The electrolyte used may be DMSO swollen Li-Nafion film plus 100 μl FEC/EMC (3/7 wt %)-based liquid electrolyte solvent. The average thickness of the DMSO swollen Li-Nafion film may be about 60 μm. The Si-dominant anodes contain about 80 wt % Si, 5 wt % graphite and 15 wt % glassy carbon (from resin), and may be laminated on 15 μm Cu foil. The average loading may be about 2-5 mg/cm$^2$. The cathodes contain about 92 wt % NCM622, 4 wt % Super P and 4 wt % PVDF5130, and may be coated on 15 μm Al foil. The average loading The long-term cycling includes: Cycle 1: Charge at 0.025 C to 4.2 V, rest 5 minutes, discharge at 0.025 C to 2.75 V, rest 5 minutes; Cycle 2 and 3: Charge at 0.025 C to 4.2 V, rest 5 minutes, discharge at 0.025 C to 3 V, rest 5 minutes; from cycle 4: Charge at 0.05 C to 4.2 V, rest 5 minutes, discharge at 0.05 C to 3 V, rest 5 minutes.

FIG. 5 indicates that these Si-dominant anode//NCM622 cathode quasi-solid cells with the Li-Nafion-based single lithium-ion conducting solid polymer electrolytes have relatively stable cycle performance even after about 10 cycles.

Note that the lower capacity at the final cycle does not indicate failure but indicates that the test is still on-going.

Figure 6A:
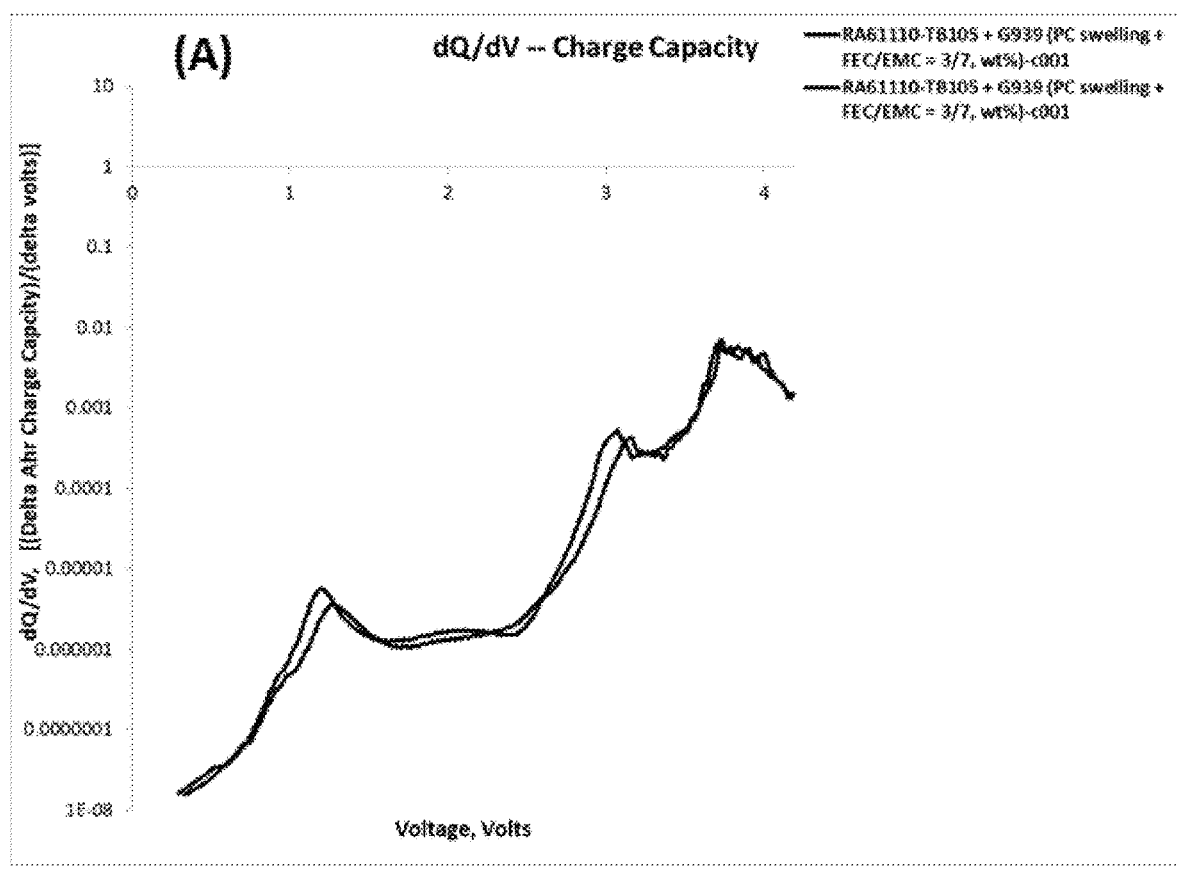
FIGS. 6A and 6B show dQ/dV—During Charge (FIG. 6A) and dQ/dV—During Discharge (FIG. 6B) curves of Si-dominant anode//NCM622 cathode full coin cells tested at 60° C. with a PC swollen Li-Nafion film (plus 80 μl FEC/EMC (3/7 wt %)) as an electrolyte, in accordance with an example embodiment of the disclosure.
Figure 6B:
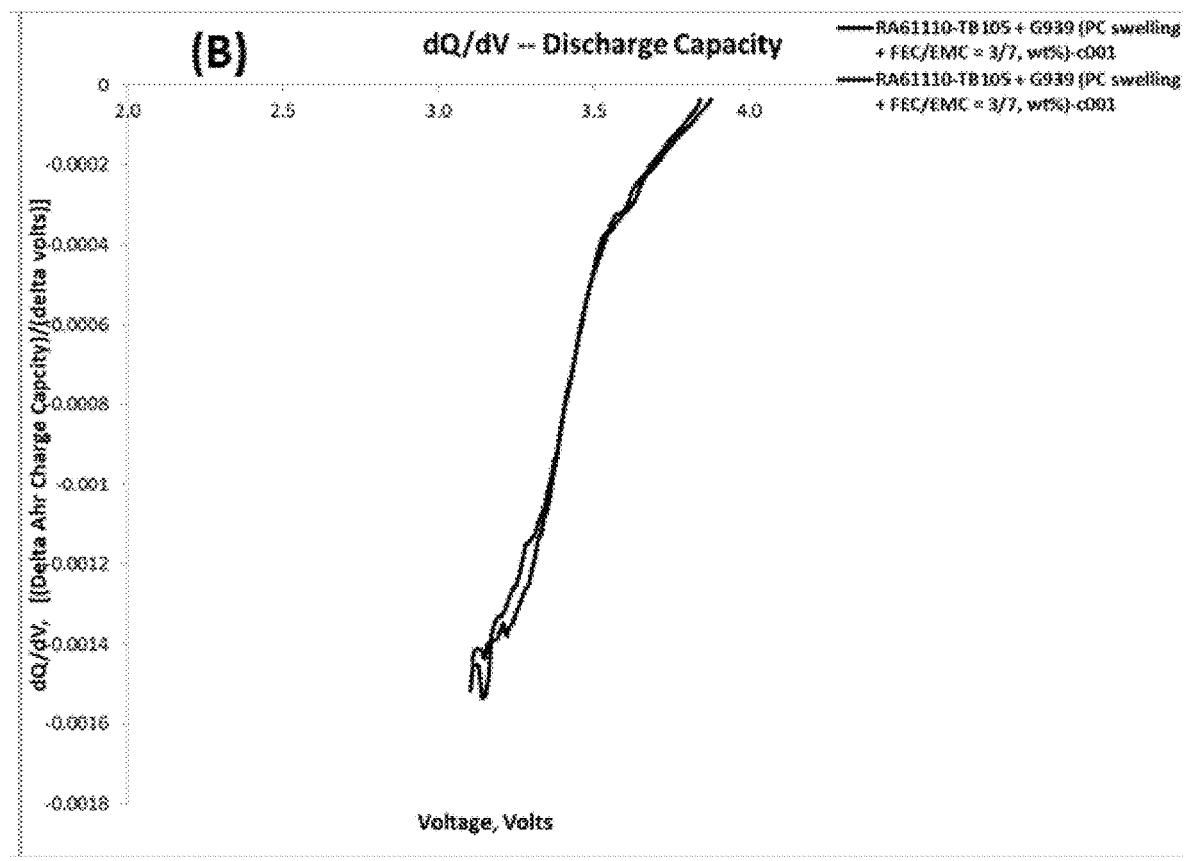

FIG. 6. dQ/dV—During Charge (6A) and dQ/dV—During Discharge (6B) curves of Si-dominant anode//NCM622 cathode full coin cells tested at 60° C. The electrolyte used may be PC swollen Li-Nafion film plus 80 µl FEC/EMC (3/7 wt %)-based liquid electrolyte solvent. The average thickness of the PC swollen Li-Nafion film may be about 60 µm. The Si-dominant anodes contain about 80 wt % Si, 5 wt % graphite and 15 wt % glassy carbon (from resin), and may be laminated on 15 µm Cu foil. The average loading may be about 2-5 mg/cm$^2$. The cathodes contain about 92 wt % NCM622, 4 wt % Super P and 4 wt % PVDF5130, and may be coated on 15 µm Al foil. The average loading may be about 20-30 mg/cm$^2$.

The dQ/dV data may be obtained through the following testing protocol: Charge at 0.025 C to 4.2 V until 0.05 C, rest 5 minutes, discharge at 0.025 C to 3.1 V, rest 5 minutes.

The 1st formation cycle dQ/dV curves in FIG. 6 show that there are several clear reduction peaks in the these Si-dominant anode//NCM622 cathode quasi-solid cells using the Li-Nafion-based single lithium-ion conducting solid polymer electrolytes of the disclosure.

Figure 7A:
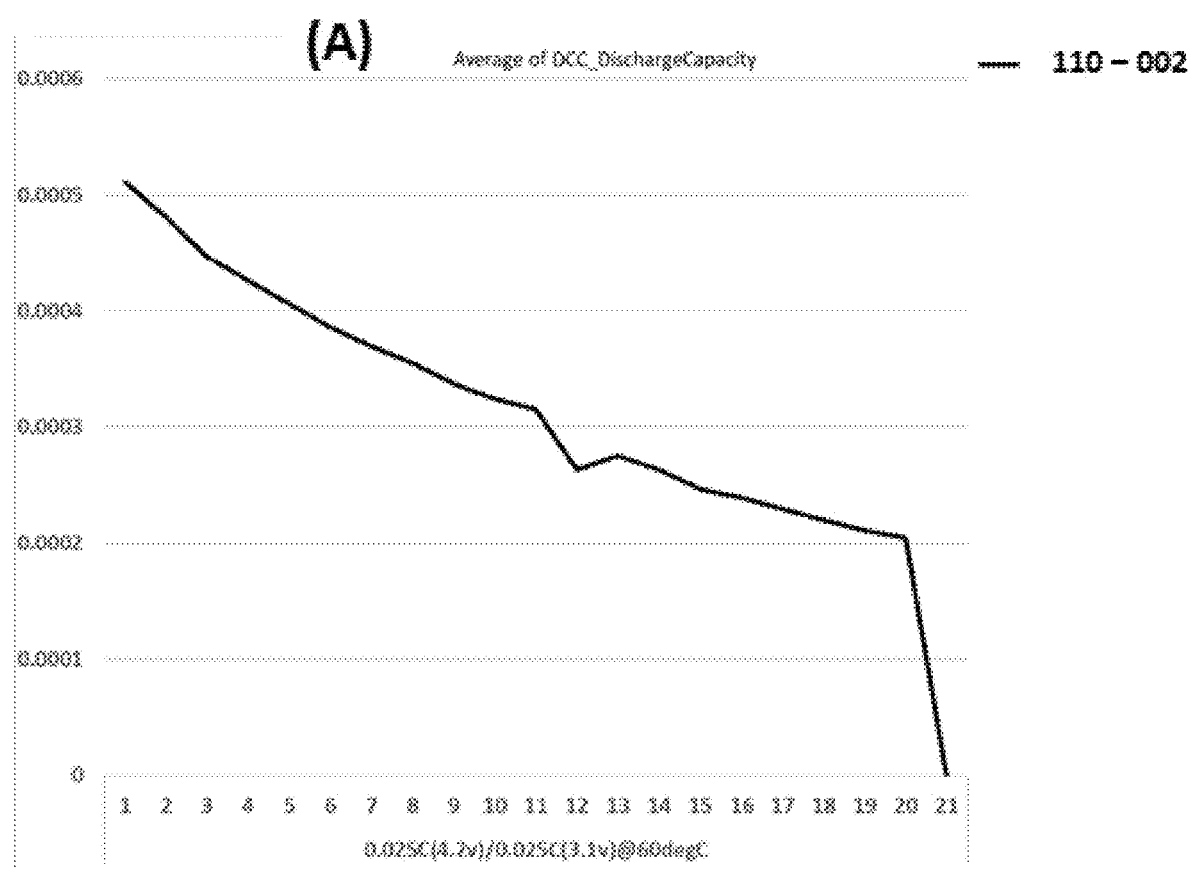
FIGS. 7A and 7B show the Capacity retention (FIG. 7A) and Normalized capacity retention (FIG. 7B) of Si-dominant anode//NCM811 cathode coin full cells tested at 60° C. with a PC swollen Li-Nafion film (plus 80 μl FEC/EMC (3/7 wt %)) as an electrolyte, in accordance with an example embodiment of the disclosure.
Figure 7B:
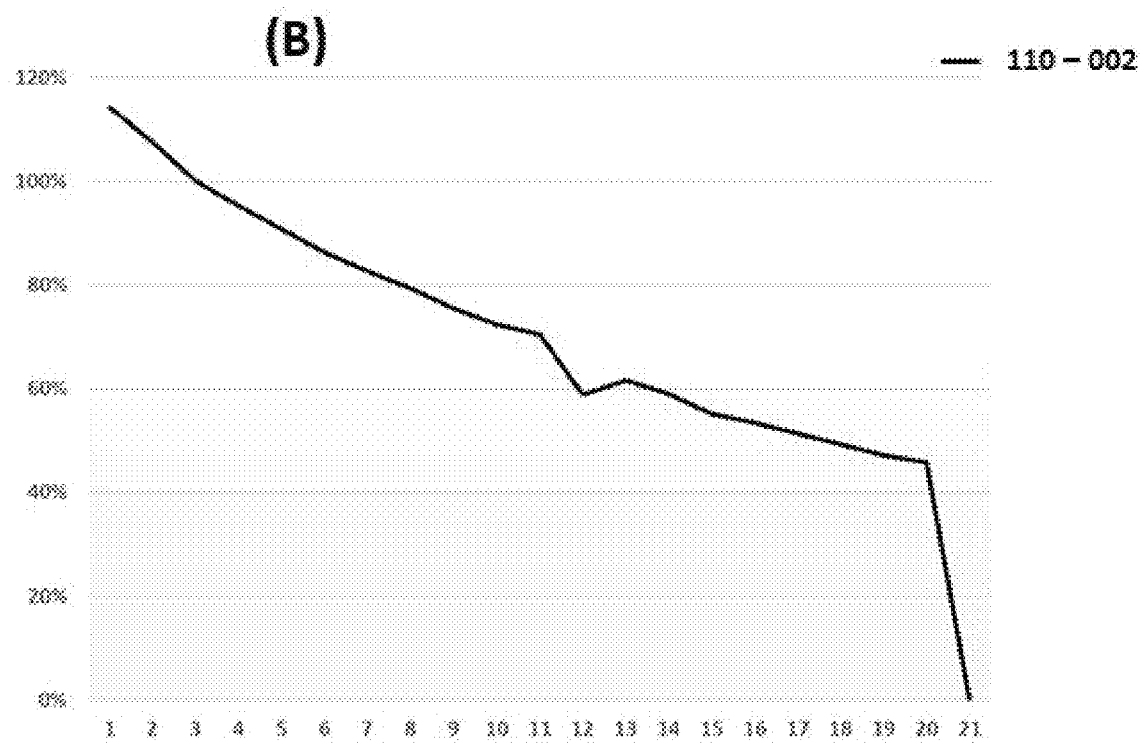

FIG. 7. Capacity retention (FIG. 7A) and Normalized capacity retention (FIG. 7B) of Si-dominant anode//NCM622 cathode full coin cells tested at 60° C. The electrolyte used may be PC swollen Li-Nafion film plus 80 µl FEC/EMC (3/7 wt %)-based liquid electrolyte solvent. The average thickness of the PC swollen Li-Nafion film may be about 60 µm. The Si-dominant anodes contain about 80 wt % Si, 5 wt % graphite and 15 wt % glassy carbon (from resin), and may be laminated on 15 µm Cu foil. The average loading may be about 2-5 mg/cm$^2$. The cathodes contain about 92 wt % NCM622, 4 wt % Super P and 4 wt % PVDF5130, and may be coated on 15 µm Al foil. The average loading The long-term cycling includes: Charge at 0.025 C to 4.2 V until 0.05 C, rest 5 minutes, discharge at 0.025 C to 3.1 V, rest 5 minutes.

FIG. 7 indicates that these Si-dominant anode//NCM622 cathode quasi-solid cells with the Li-Nafion-based single lithium-ion conducting solid polymer electrolytes have relatively stable cycle performance even after about 20 cycles. Note that the lower capacity at the final cycle does not indicate failure but indicates that the test is still on-going.

Figure 8A:
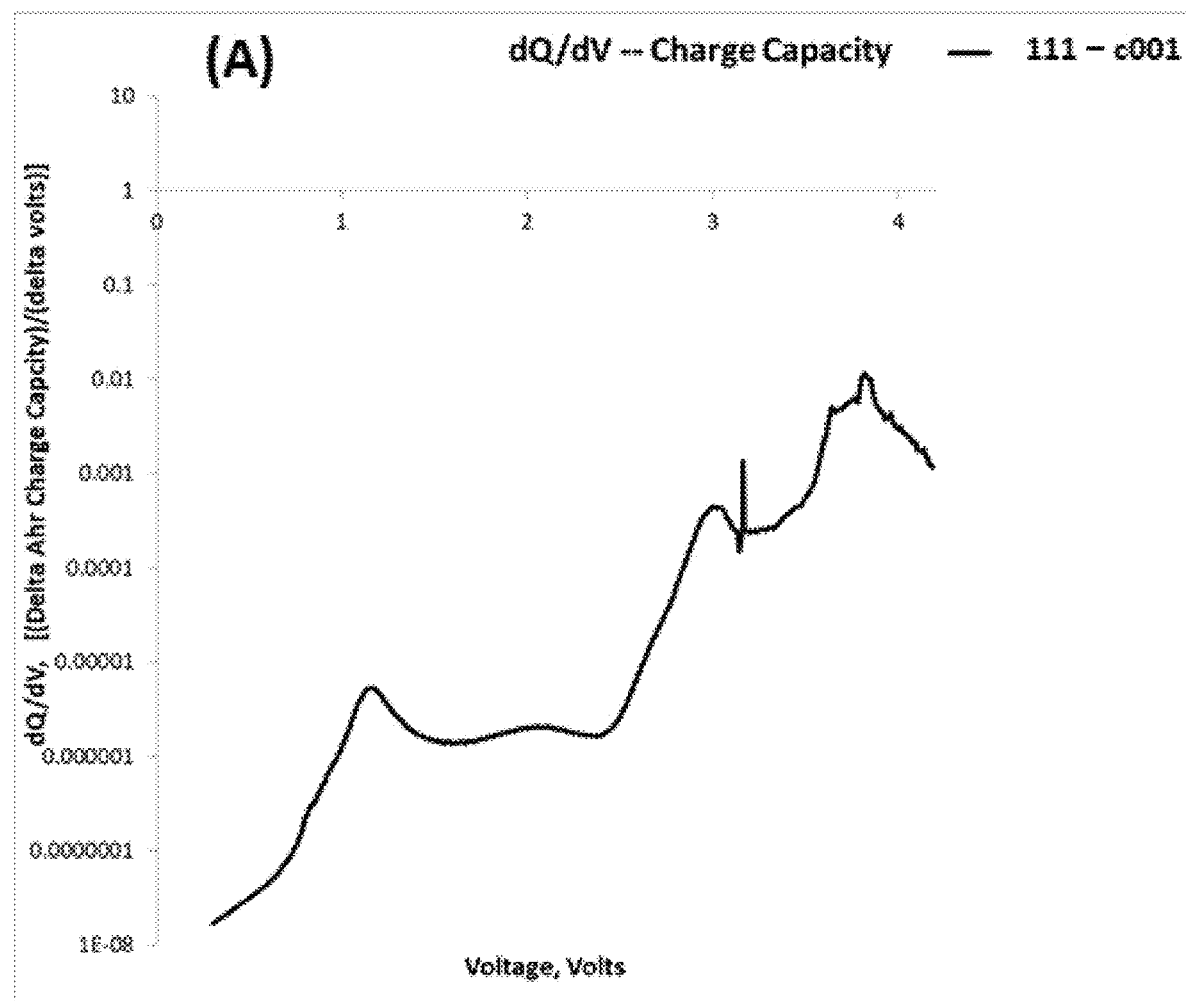
FIGS. 8A and 8B show dQ/dV—During Charge (FIG. 8A) and dQ/dV—During Discharge (FIG. 8B) curves of Si-dominant anode//NCM622 cathode full coin cells tested at 60° C. with a PC swollen Li-Nafion film (plus 80 μl FEC/PC/EMC (2/1/7 vol %)) as an electrolyte, in accordance with an example embodiment of the disclosure.
Figure 8B:
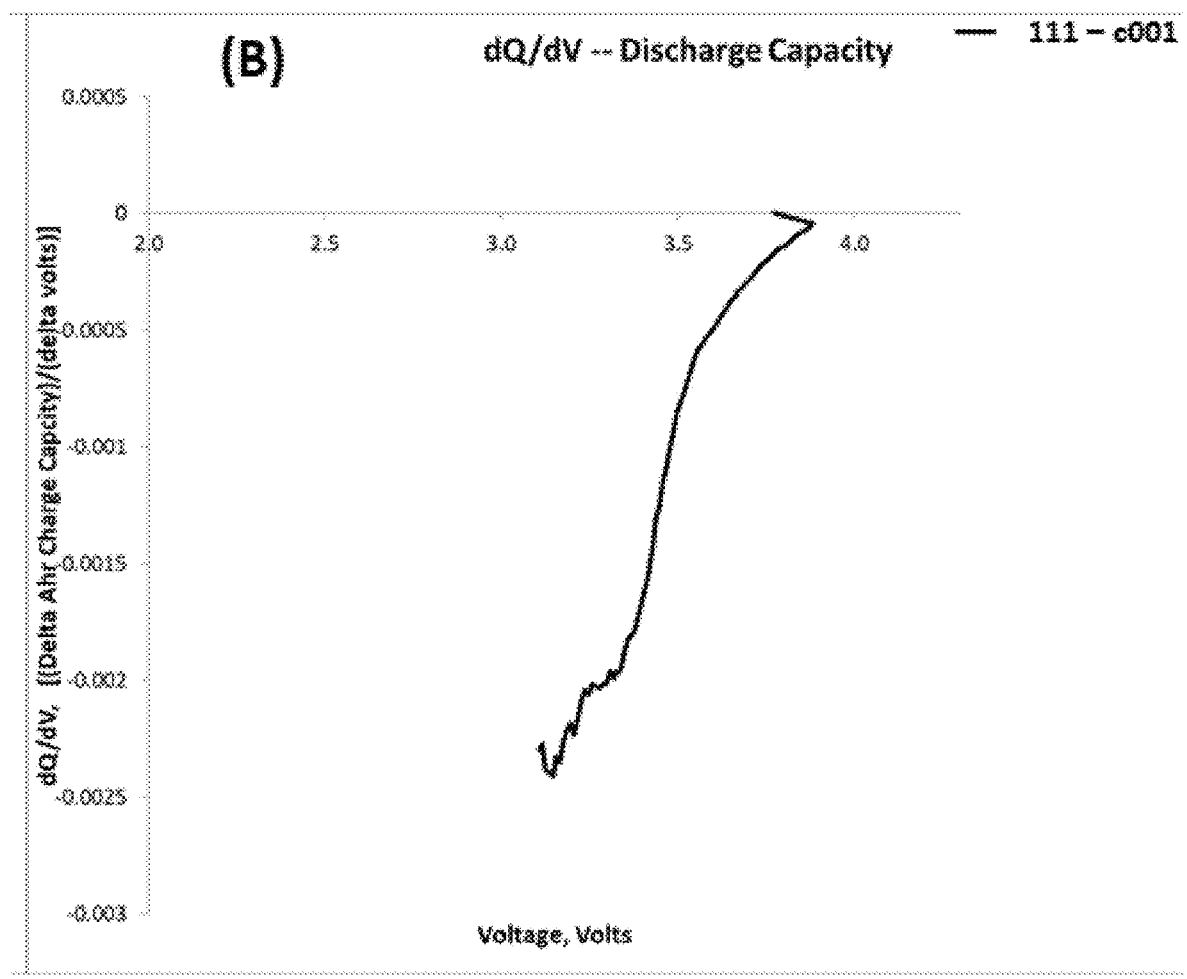

FIG. 8. dQ/dV—During Charge (8A) and dQ/dV—During Discharge (8B) curves of Si-dominant anode//NCM622 cathode full coin cells tested at 60° C. The electrolyte used may be PC swollen Li-Nafion film plus 80 µl FEC/PC/EMC (2/1/7 vol %)-based liquid electrolyte solvent. The average thickness of the PC swollen Li-Nafion films membrane may be about 60 µm. The Si-dominant anodes contain about 80 wt % Si, 5 wt % graphite and 15 wt % glassy carbon (from resin), and may be laminated on 15 µm Cu foil. The average loading may be about 2-5 mg/cm$^2$. The cathodes contain about 92 wt % NCM622, 4 wt % Super P and 4 wt % PVDF5130, and may be coated on 15 µm Al foil. The average loading may be about 20-30 mg/cm$^2$.

The dQ/dV data may be obtained through the following testing protocol: Charge at 0.025 C to 4.2 V until 0.05 C, rest 5 minutes, discharge at 0.025 C to 3.1 V, rest 5 minutes.

The 1st formation cycle dQ/dV curves in FIG. 8 show that there are several clear reduction peaks in the these Si-dominant anode//NCM622 cathode quasi-solid cells using the Li-Nafion-based single lithium-ion conducting solid polymer electrolytes of the disclosure.

Figure 9A:
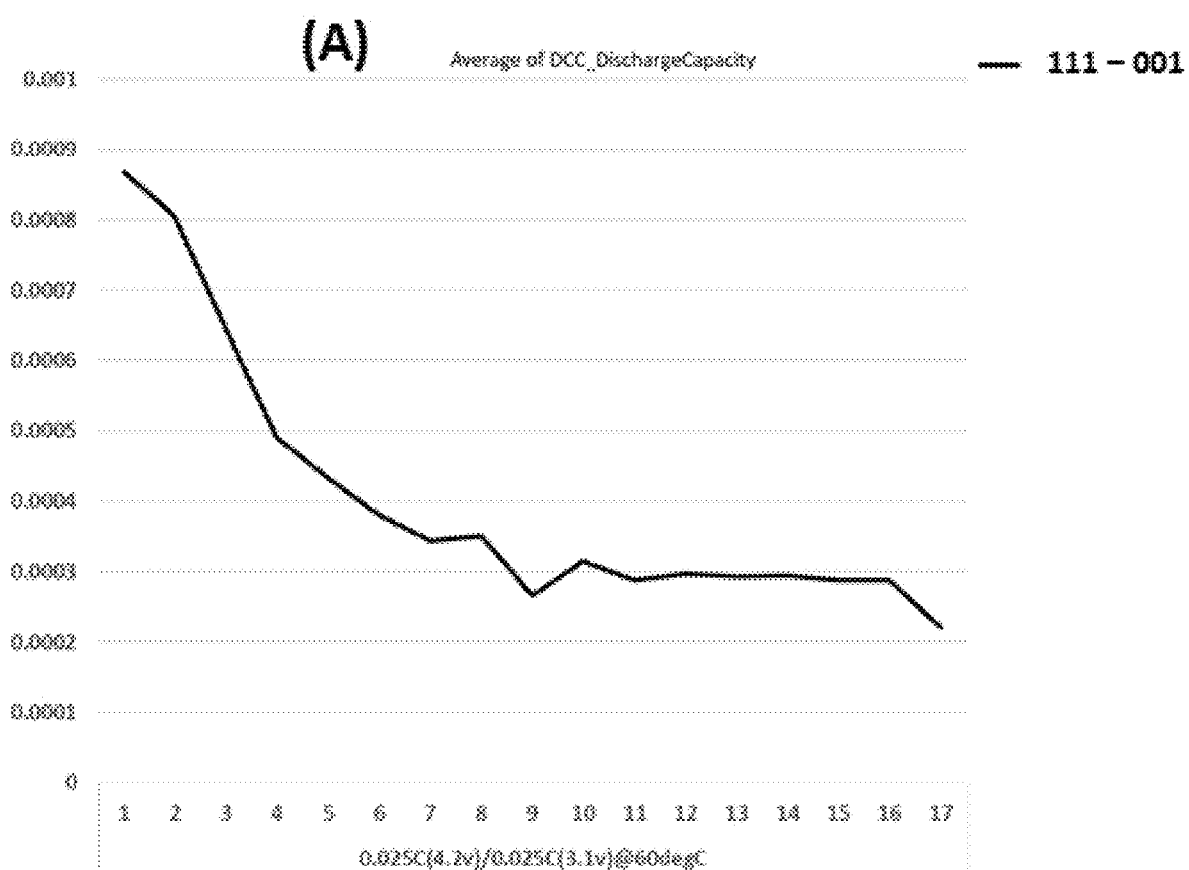
FIGS. 9A and 9B show the Capacity retention (FIG. 9A) and Normalized capacity retention (FIG. 9B) of Si-dominant anode//NCM811 cathode coin full cells tested at 60° C. with a PC swollen Li-Nafion film (plus 80 μl FEC/PC/EMC (2/1/7 vol %)) as an electrolyte, in accordance with an example embodiment of the disclosure
Figure 9B:
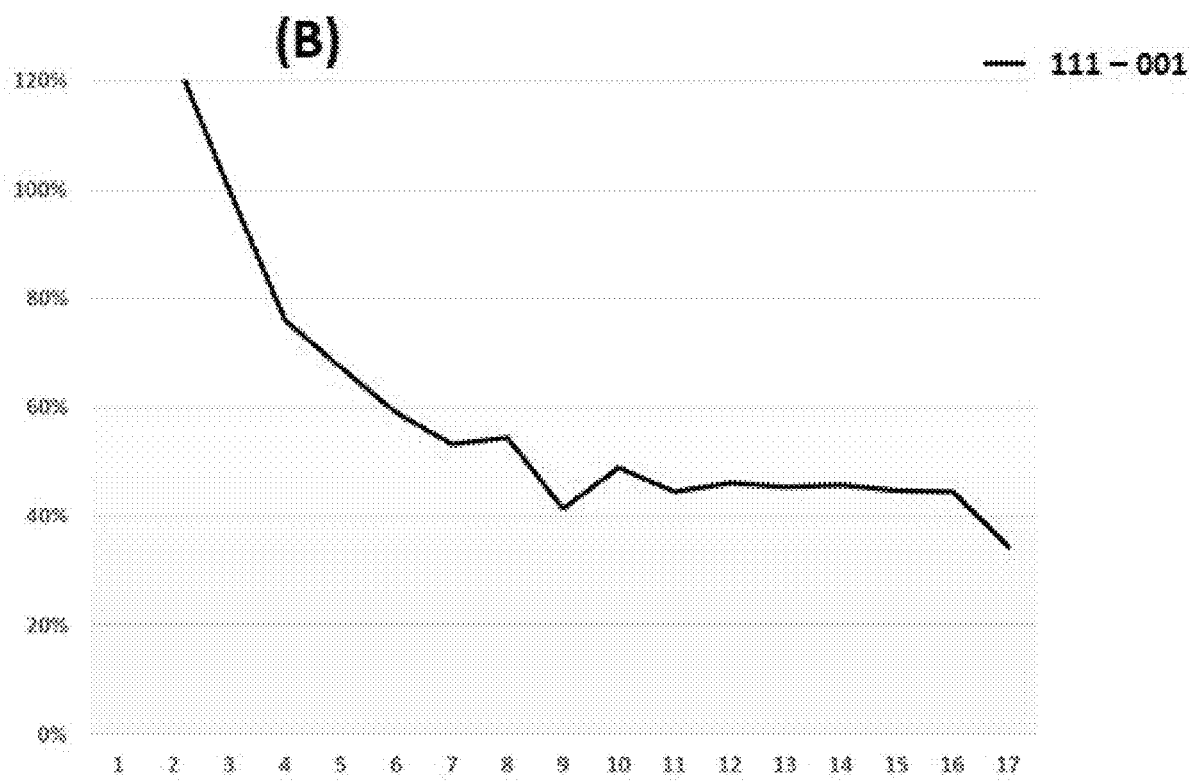

FIG. 9. Capacity retention (FIG. 9A) and Normalized capacity retention (FIG. 9B) of Si-dominant anode//NCM622 cathode full coin cells tested at 60° C. The electrolyte used may be PC swollen Li-Nafion film plus 80 µl FEC/PC/EMC (2/1/7 vol %)-based liquid electrolyte solvent. The average thickness of the PC swollen Li-Nafion film may be about 60 µm. The Si-dominant anodes contain about 80 wt % Si, 5 wt % graphite and 15 wt % glassy carbon (from resin), and may be laminated on 15 µm Cu foil. The average loading may be about 2-5 mg/cm$^2$. The cathodes contain about 92 wt % NCM622, 4 wt % Super P and 4 wt % PVDF5130, and may be coated on 15 µm Al foil. The average loading The long-term cycling includes: Charge at 0.025 C to 4.2 V until 0.05 C, rest 5 minutes, discharge at 0.025 C to 3.1 V, rest 5 minutes.

FIG. 9 indicates that these Si-dominant anode//NCM622 cathode quasi-solid cells with the Li-Nafion-based single lithium-ion conducting solid polymer electrolytes have relatively stable cycle performance even after about 15 cycles. Note that the lower capacity at the final cycle does not indicate failure but indicates that the test is still on-going.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry, or a device is "operable" to perform a function whenever the battery, circuitry, or device comprises the necessary hardware and code (if any is necessary) or other elements to perform the function, regardless of whether the performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An energy storage device comprising:
    a first electrode and a second electrode, wherein one or both of the first electrode and the second electrode is a Si-based electrode;

a separator between the first electrode and the second electrode; and an electrolyte; wherein said electrolyte is a single Li-ion conducting solid-state polymer electrolyte, wherein said single Li-ion conducting solid-state polymer electrolyte is selected from the group consisting of lithium poly[(4-styrenesulfonyl) (fluorosulfonyl)imide] (LiPSFSI); lithium poly[(4-styrenesulfonyl)(trifluoromethanesulfonyl)imide] (LiPSTFSI); lithium poly(4-styrenesulfonate) (LiPSS); poly[(o-carboxy)oligo(oxyethylene) methacrylate]; copolymer of oligo(oxyethylene) methacrylate and lithium methacrylate; copolymer of oligo(oxyethylene) methacrylate; and lithium acrylamidocaproate;

wherein the second electrode is a Si-dominant electrode and wherein the Si-dominant electrode comprises:

greater than 0% and less than about 95% by weight of silicon particles, and greater than 0% and less than about 90% by weight of one or more types of carbon phases, wherein at least one of the one or more types of carbon phases is a substantially continuous phase that holds the Si-dominant electrode together such that the silicon particles are distributed throughout the Si-dominant electrode.

2. The energy storage device of claim 1, wherein the second electrode comprises a self-supporting composite material film.

3. The energy storage device of claim 1, wherein the second electrode comprises a Si/graphite composite, Silicon oxide, Silicon oxide/graphite composite or Silicon nitride.

4. The energy storage device of claim 1, wherein the second electrode comprises greater than 80% Si.

5. The energy storage device of claim 1, wherein the single Li-ion conducting solid-state polymer electrolyte is combined with a dual-ion conductor.

6. The energy storage device of claim 5, wherein said dual-ion conductor is a liquid electrolyte.

7. The energy storage device of claim 5, wherein said dual-ion conductor is a solid electrolyte.

8. The energy storage device of claim 1, wherein the single Li-ion conducting solid-state polymer electrolyte also forms at least a part of the separator.

9. The energy storage device of claim 8, wherein the single Li-ion conducting solid-state polymer electrolyte also forms the separator, which is a thin polymer film.

10. The energy storage device of claim 9, wherein the thin polymer film is 50 microns or less.

* * * * *